United States Patent
Hassebrook et al.

(10) Patent No.: US 8,224,068 B2
(45) Date of Patent: Jul. 17, 2012

(54) LOCK AND HOLD STRUCTURED LIGHT ILLUMINATION

(75) Inventors: Laurence G. Hassebrook, Lexington, KY (US); Daniel L. Lau, Lexington, KY (US); Charles J. Casey, Lexington, KY (US)

(73) Assignee: University of Kentucky Research Foundation (UKRF), Lexington, KY (US)

( * ) Notice: Subject to any disclaimer, the term of this patent is extended or adjusted under 35 U.S.C. 154(b) by 930 days.

(21) Appl. No.: 12/284,253

(22) Filed: Sep. 18, 2008

(65) Prior Publication Data

US 2009/0103777 A1    Apr. 23, 2009

Related U.S. Application Data

(60) Provisional application No. 60/994,181, filed on Sep. 18, 2007.

(51) Int. Cl.
*G06K 9/00* (2006.01)

(52) U.S. Cl. .................... 382/154; 345/419

(58) Field of Classification Search ............... 382/100, 382/154, 181, 190, 195, 203, 206; 345/418–427; 356/12
See application file for complete search history.

(56) References Cited

U.S. PATENT DOCUMENTS

| | | | |
|---|---|---|---|
| 7,440,590 B1 | 10/2008 | Hassebrook et al. | |
| 7,474,803 B2 * | 1/2009 | Petrov et al. | 382/285 |
| 7,620,209 B2 * | 11/2009 | Stevick et al. | 382/106 |
| 7,844,079 B2 | 11/2010 | Hassebrook et al. | |

(Continued)

OTHER PUBLICATIONS

KDI-LIS program found at http:/www.nsf.gov/pubs/1999/nsf9929/nsf9929.htm (1999), eight pages downloaded prior to filing of applicants' U.S. Appl. No. 60/994,181 and labeled and incorporated as "Attachment A" in applicants' U.S. Appl. No. 60/994,181 to which instant US app was granted priority.

(Continued)

*Primary Examiner* — Anand Bhatnagar
(74) *Attorney, Agent, or Firm* — Macheledt Bales LLP

(57) ABSTRACT

A method, system, and associated program code, for 3-dimensional image acquisition, using structured light illumination, of a surface-of-interest under observation by at least one camera. One aspect includes: illuminating the surface-of-interest, while static/at rest, with structured light to obtain initial depth map data therefor; while projecting a hold pattern comprised of a plurality of snake-stripes at the static surface-of-interest, assigning an identity to and an initial lock position of each of the snake-stripes of the hold pattern; and while projecting the hold pattern, tracking, from frame-to-frame each of the snake-stripes. Another aspect includes: projecting a hold pattern comprised of a plurality of snake-stripes; as the surface-of-interest moves into a region under observation by at least one camera that also comprises the projected hold pattern, assigning an identity to and an initial lock position of each snake-stripe as it sequentially illuminates the surface-of-interest; and while projecting the hold pattern, tracking, from frame-to-frame, each snake-stripe while it passes through the region. Yet another aspect includes: projecting, in sequence at the surface-of-interest positioned within a region under observation by at least one camera, a plurality of snake-stripes of a hold pattern by opening/moving a shutter cover; as each of the snake-stripes sequentially illuminates the surface-of-interest, assigning an identity to and an initial lock position of that snake-stripe; and while projecting the hold pattern, tracking, from frame-to-frame, each of the snake-stripes once it has illuminated the surface-of-interest and entered the region.

24 Claims, 9 Drawing Sheets

U.S. PATENT DOCUMENTS

| | | | | |
|---|---|---|---|---|
| 7,860,301 | B2 * | 12/2010 | Se et al. | 382/154 |
| 7,899,220 | B2 * | 3/2011 | Haex et al. | 382/128 |
| 2006/0227133 | A1 * | 10/2006 | Petrov et al. | 345/419 |
| 2010/0194862 | A1 * | 8/2010 | Givon | 348/49 |
| 2011/0050859 | A1 * | 3/2011 | Kimmel et al. | 348/50 |
| 2011/0151974 | A1 * | 6/2011 | Deaguero | 463/37 |

OTHER PUBLICATIONS

Jielin Li, reprint of several of the slides in presentation "Intelligent 3-D light sensor for video-rate telecollaboration" Signal and image Processing Lab, EE Dept, Univ. of Kentucky (date unknown); labeled and incorporated as "Attachment B" (total of 14 pages) in applicants' U.S. Appl. No. 60/994,18,1 to which instant US app was granted priority.

Backoround materials consisting of four pages of a manuscript (circa Nov. 1998) containing an overview of known Structured Light Patterning concepts; labeled and incorporated as "Attachment C" in applicants' U.S. Appl. No. 60/994,181 to which instant US app was granted priority.

Yalla, Veera Ganesh and L.G. Hassebrook: "Very-High Resolution 3D Surface Scanning using Multi-Frequency Phase Measuring Profilometly," Edited by Peter Tchoryk, Jr. and Brian Holz, SPIE Defense and Security, Spaceborne Sensors II, Orlando, Florida, US, vol. 5798-09, (Mar. 28, 2005); referenced in applicants' specification on p. 18.

Hassebrook, L.G., Ray C. Daley and William Chimitt, "Application of Communication Theory to High Speed Structured Light Illumination," Edited by Harding and Svetkoff, SPIE Proceedings, 3204(15), 102-113 (Oct. 1997); referenced in applicants' specification on p. 18.

Goodnman, D.S. and L.G. Hassebrook, "Surface Contour Measuring Instrument." IBM Technical Disclosure Bulletin, 27(45), 2671-2673, (Dec. 1984); referenced in applicants' specification on p. 18.

* cited by examiner

FIG. 1A
STATIC "LOCK & HOLD" (L&H)

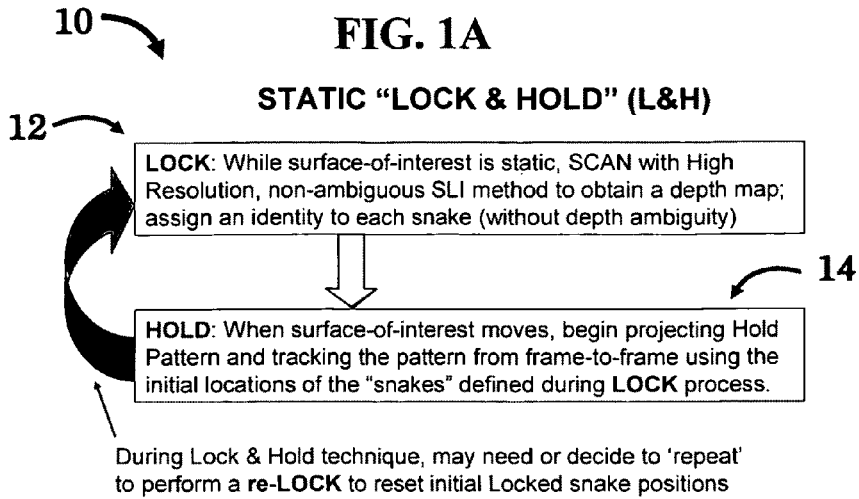

LOCK: While surface-of-interest is static, SCAN with High Resolution, non-ambiguous SLI method to obtain a depth map; assign an identity to each snake (without depth ambiguity)

HOLD: When surface-of-interest moves, begin projecting Hold Pattern and tracking the pattern from frame-to-frame using the initial locations of the "snakes" defined during LOCK process.

During Lock & Hold technique, may need or decide to 'repeat' to perform a re-LOCK to reset initial Locked snake positions

FIG. 1B

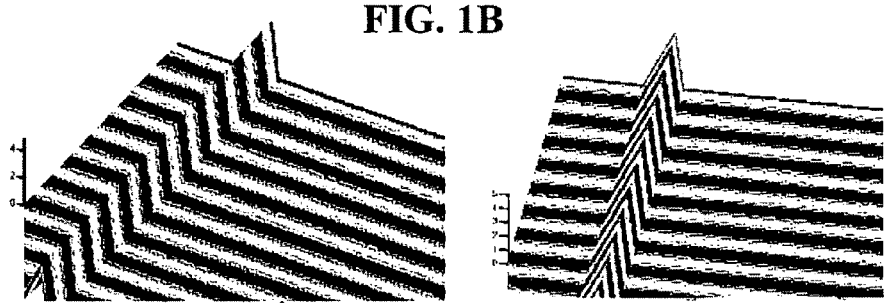

FIG. 2
TEMPORAL AND SPATIAL DYNAMIC LOCK & HOLD

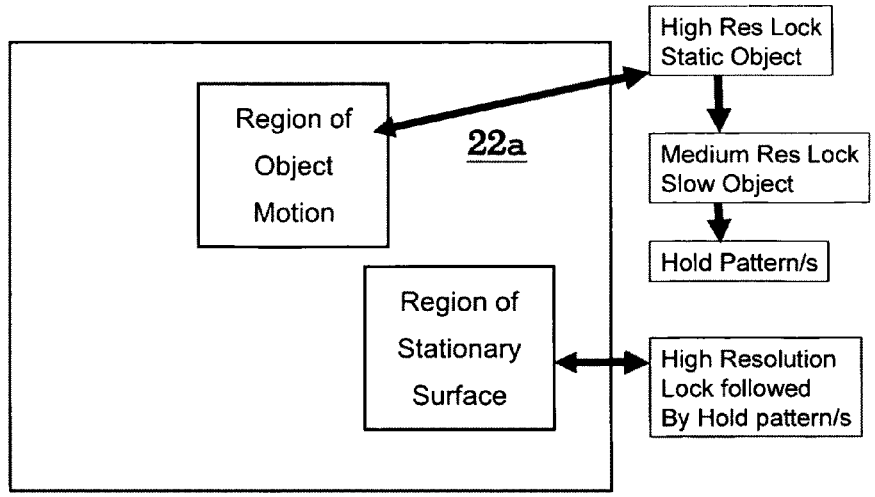

FOV of sensor or Scan Volume is processed differently depending on local area surface motion

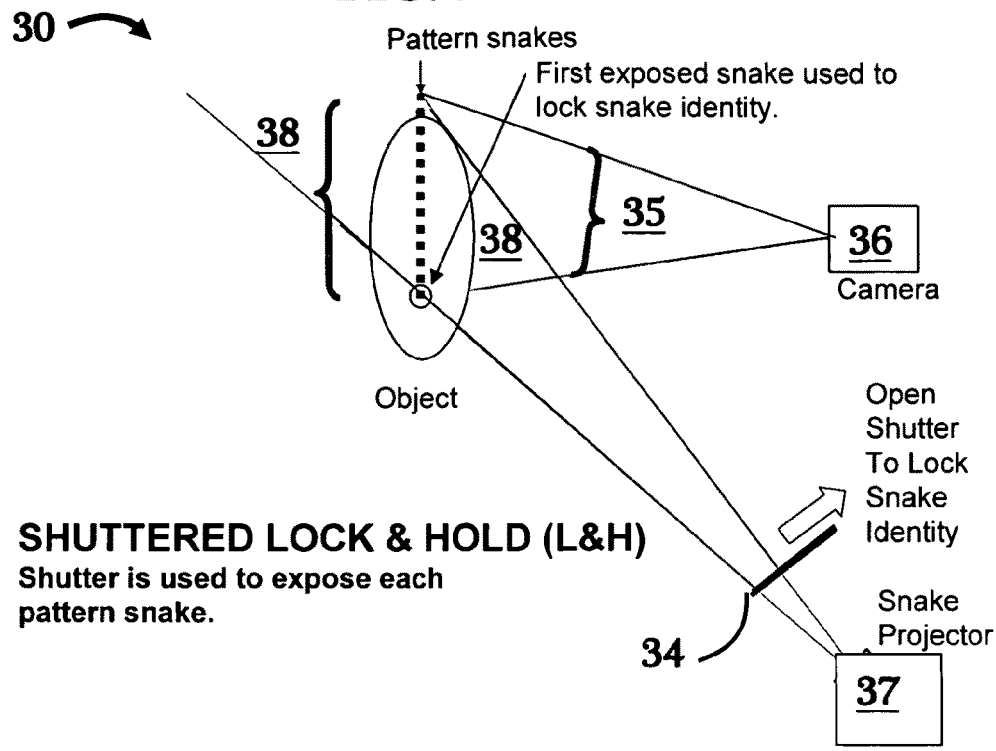
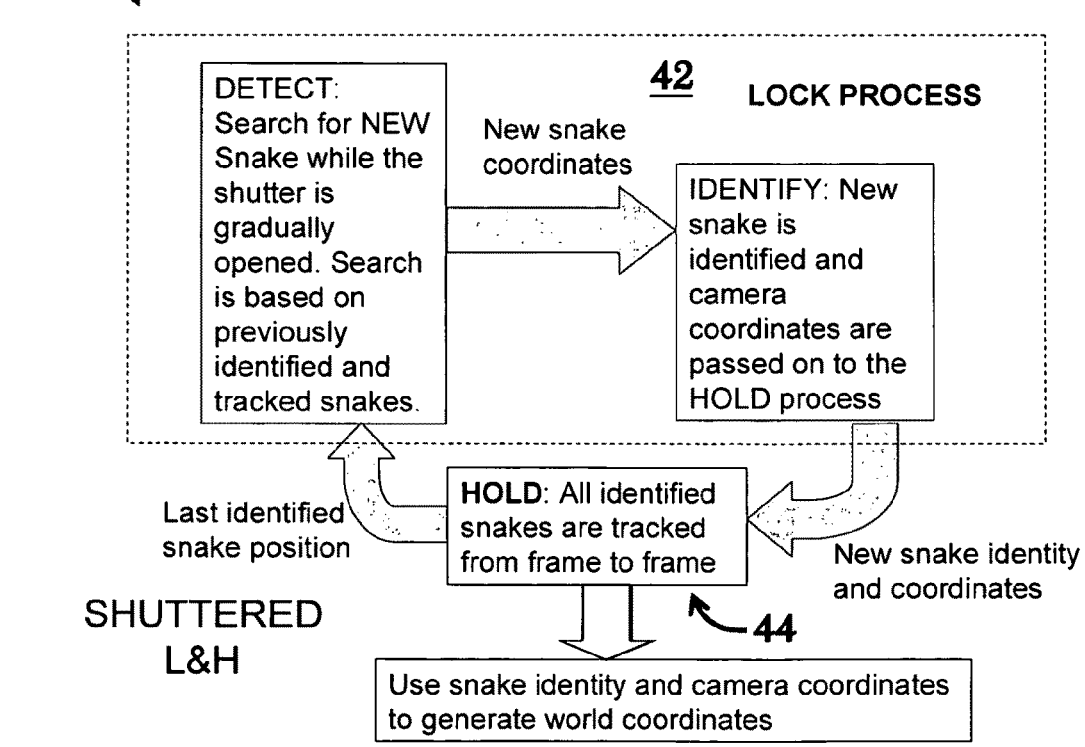

OBJECT-SHUTTERED LOCK & HOLD (L&H)
Object moves into pattern

OBJECT-SHUTTERED L&H

LOCK AND HOLD STRUCTURED LIGHT ILLUMINATION

PRIORITY BENEFIT TO CO-PENDING PATENT APPLICATIONS

This application claims the benefit of pending U.S. provisional Pat. App. No. 60/994,181 filed 18 Sep. 2007 describing developments of the applicants hereof, on behalf of the assignee. The specification, drawings, and technical background materials of applicants' provisional app. No. 60/994,181 are hereby incorporated herein by reference, in their entirety, to the extent they provide further edification of the advancements set forth herein.

BACKGROUND OF THE INVENTION

1. Field of the Invention

In general, the present invention relates to computer implemented systems, as well as associated techniques, for performing three-dimensional ("3D") imaging of surfaces undergoing animation/motion.

Current implementations of 3D image acquisition are almost exclusively limited to single-frame captures. Systems in development which promise 3D video capture frequently have drawbacks such as loss of detail and generally demand use of expensive, specialized equipment. The new Lock and Hold ("L&H") technique of the invention provides a way to create dense 3D models of full-motion sequences—utilizing the less expensive, more-conventional computerized system components typically employed for basic 3D structured light imaging. In most cases, conventional 3D imaging is limited to collecting images as individual frames. The novel technique contemplated hereby for full-motion 3D imaging, uses a unique structured light projection and image acquisition technique coined by the applicants as "Lock and Hold" (sometimes referred to herein, and shortened to "L&H", for simplicity).

2. General Discussion of Technology (by Way of Reference, Only): Historical Perspective Systems currently in use for 3D animation capture produce limited results due for the most part, to limitations in technology, particularly resolution and speed of conventional digital projectors. One way to minimize this problem, is to employ the benefits of advance Spatial Light Modulator (SLM) technology, with resolutions between 1×4096 to 1×12,000 eight bit pixel control. Furthermore, SLM technologies can be operated as diffractive or holographic principles.

The background materials labeled and identified as ATTACHMENTS A, B, and C to pending U.S. provisional Pat. App. No. 60/994,181—to which the instant application claims priority—each such ATTACHMENT authored by one of more of the listed applicants, illustrate prior available analysis and framing of what applicants refer to as Dynamic Structured Light Illumination (SLI). ATTACHMENT A is a manuscript (1999). ATTACHMENT B is a reprint of associated slides, evidencing the complex, multifaceted nature of problems encountered by those attempting to create solutions in the area of 3D image acquisition employing structured light illumination (SLI) techniques. ATTACHMENT C consists of pages of a manuscript (circa 1999) containing an overview of known Structured Light Patterning concepts.

A technique coined 'Dynamic SLI' is explained in ATTACHMENTS A and B. Dynamic SLI does not lock and hold patterns, but rather, Dynamic SLI simply detects motion of object and based on a threshold level of motion, Dynamic SLI applies a SLI pattern/s to the spatial region to capture a surface topology. It is believed that depth resolution decreases with object speed or level of motion during Dynamic SLI.

The communications technique known as 1-Dimensional (1D) signal PLL, is explained in Digital and Analog Communication Systems by Leon W. Couch II, $7^{th}$ Ed, Prentice Hall, 2001.

Background: Computerized Devices, Memory & Storage Devices/Media.

I. Digital computers. A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction (s) are used to trigger computations carried out by the CPU.

II. Computer Memory and Computer Readable Storage. While the word 'memory' has historically referred to that which is stored temporarily, with storage traditionally used to refer to a semi-permanent or permanent holding place for digital data—such as that entered by a user for holding long term—more-recently, the definitions of these terms have blurred. A non-exhaustive listing of well known computer readable storage device technologies are categorized here for reference: (1) magnetic tape technologies; (2) magnetic disk technologies include floppy disk/diskettes, fixed hard disks (often in desktops, laptops, workstations, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, and so on.

SUMMARY OF THE INVENTION

Briefly described, once again, is a computerized system and method/technique for 3D image acquisition, for subsequent reproduction, of a surface-of-interest in motion utilizing at least one camera/image acquisition device and at least one structured light projector unit directed at the surface-of-interest employing a unique lock and hold technique. During LOCK, a depth map is obtained of the surface-of-interest and further data is gathered, such as, the assigning of an identity to each of a plurality of snakes, or light stripes. During HOLD, while the surface-of-interest moves, a HOLD structured light pattern is projected and tracked from frame-to-frame using the initial data gathered during LOCK, such as the identity and initial location(s) of the snake/light stripe(s).

A technique, system and program code, for 3-dimensional image acquisition of a surface-of-interest under observation by at least one camera using structured light illumination. One aspect includes: illuminating the surface-of-interest, while static/at rest, with structured light to obtain initial depth map data therefor; while projecting a hold pattern comprised of a plurality of snake-stripes at the static surface-of-interest, assigning an identity to and an initial lock position of each of the snake-stripes of the hold pattern; and while projecting the hold pattern, tracking, from frame-to-frame each of the snake-stripes. Another aspect includes: projecting a hold pattern comprised of a plurality of snake-stripes; as the surface-of-interest moves into a region under observation by at least one camera that also comprises the projected hold pattern, assigning an identity to and an initial lock position of each snake-stripe as it sequentially illuminates the surface-of-interest; and while projecting the hold pattern, tracking, from frame-to-frame, each snake-stripe while it passes through the region. Yet another aspect includes: projecting, in sequence at the surface-of-interest positioned within a region under observation by at least one camera, a plurality of snake-stripes of a hold pattern by opening/moving a shutter cover; as each of the snake-stripes sequentially illuminates the surface-of-interest, assigning an identity to and an initial lock position of that snake-stripe; and while projecting the hold pattern, tracking, from frame-to-frame, each of the snake-stripes once it has illuminated the surface-of-interest and entered the region.

BRIEF DESCRIPTION OF DRAWINGS/INCORPORATION OF ATTACHMENT(S)

For purposes of illustrating the innovative nature plus the flexibility of design and versatility of the new system and associated technique, as customary, figures are included. One can readily appreciate the advantages as well as novel features that distinguish the instant invention from conventional computer-implemented 3D imaging techniques. The figures as well as any incorporated technical materials have been included to communicate the features of applicants' innovation by way of example, only, and are in no way intended to limit the disclosure hereof. Each item labeled an ATTACHMENT and included as part of applicants' pending provisional Pat. App. No. 60/994,181, is hereby incorporated herein by reference for purposes of providing background technical information.

FIG. 1A is a high-level diagram depicting a Static Lock and Hold (L&H) technique 10 having the distinguishing two 'phases': LOCK 12 and HOLD 14.

FIG. 1B depicts the concept of ambiguity that is encountered when projecting structured light on a surface-of-interest from which one is attempting to acquire image information: at left, from the instant viewing angle, the lines (light and dark stripes) match up to appear as if there exists a step-edge; at right, from a different view of the same surface-of-interest, one can see it is—in fact—a ramp-up with ramp-down surface.

FIG. 2 is a high-level diagram depicting an alternative L&H technique of the invention: Temporal and Spatial Dynamic Lock and Hold (L&H) 20.

FIGS. 3 and 4 are high-level diagrams depicting yet another L&H technique alternative: Shuttered Lock and Hold (L&H): FIG. 3 depicts system components 30 employed to implement method 40 (FIG. 4).

FIGS. 5 and 6 are high-level diagrams depicting yet another L&H technique alternative: Object-Shuttered Lock and Hold (L&H): FIG. 5 depicts system components 50 employed to implement method 60 (FIG. 4).

Figure 11:
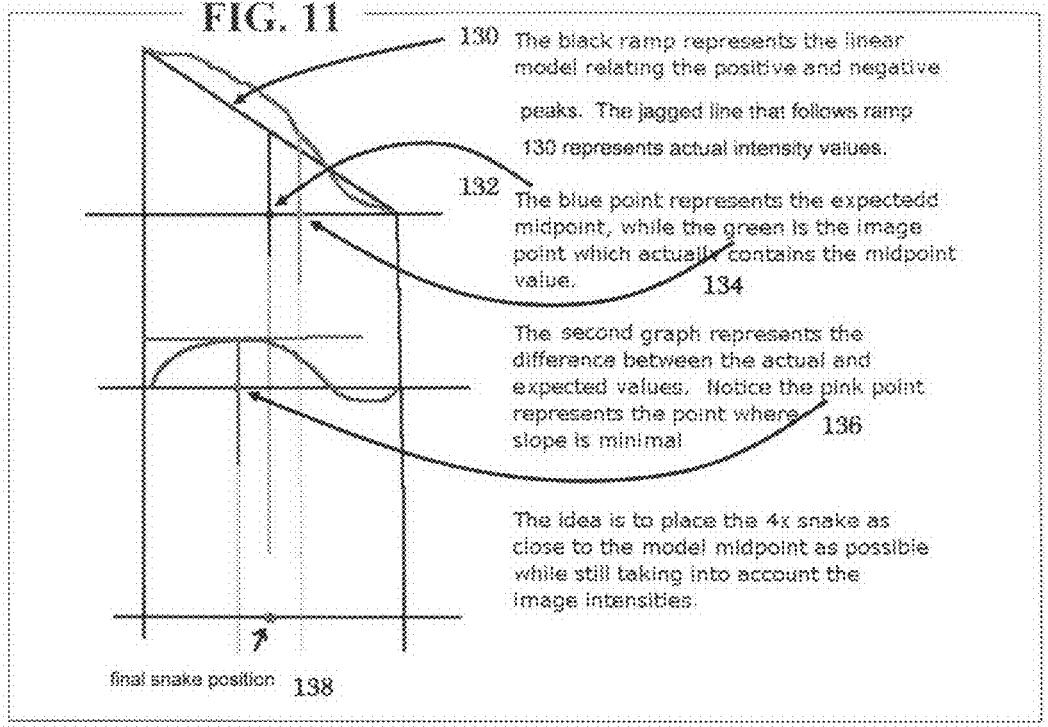

FIG. 11 graphically represents certain concepts of the subroutines of EXAMPLE 02.

Figure 5:
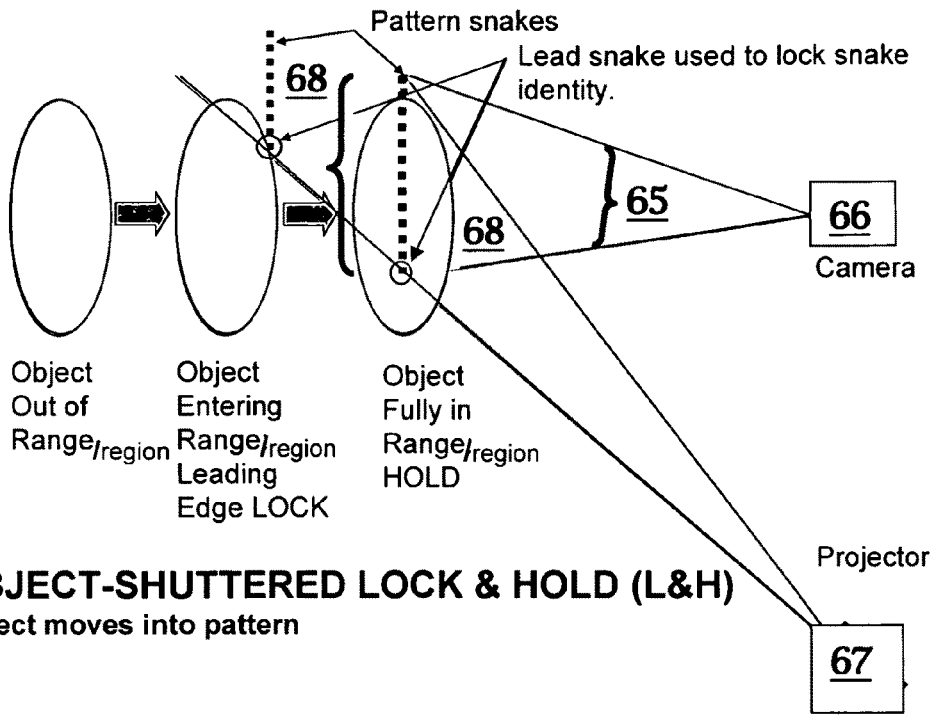
Figure 6:
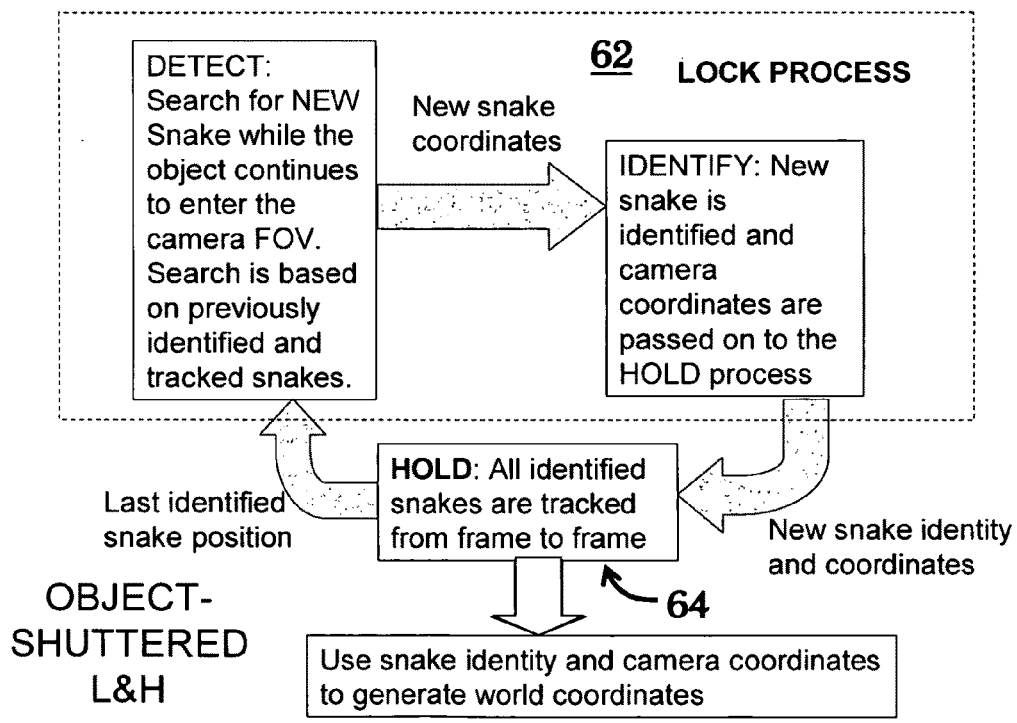
Figure 12:
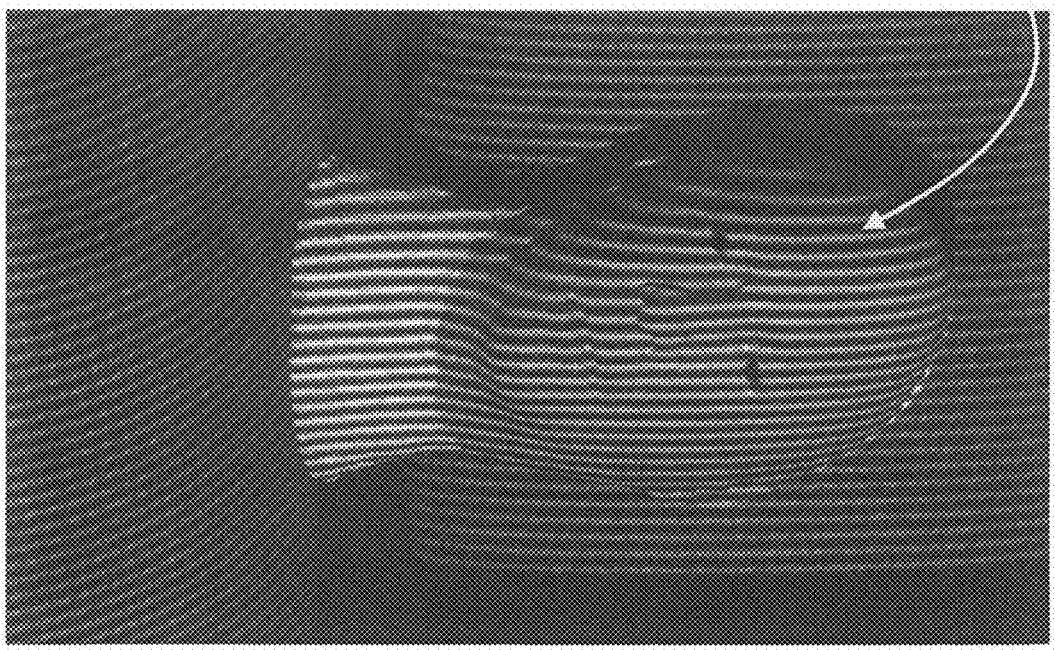

FIG. 12 is a computer-generated/implemented "raw image" 140 of the bust of a head—shown on its side—comprising many stripes; each stripe 142 represents the concept of one "snake". By way of example, in connection with the shuttered techniques depicted by FIGS. 3, 4, 5, and 6: many snakes are employed, whereby LOCK is performed by introducing one new snake at a time, either by opening a shutter (FIGS. 3 and 4) or by moving the object into the projected pattern space (FIGS. 5 and 6).

Figure 13:
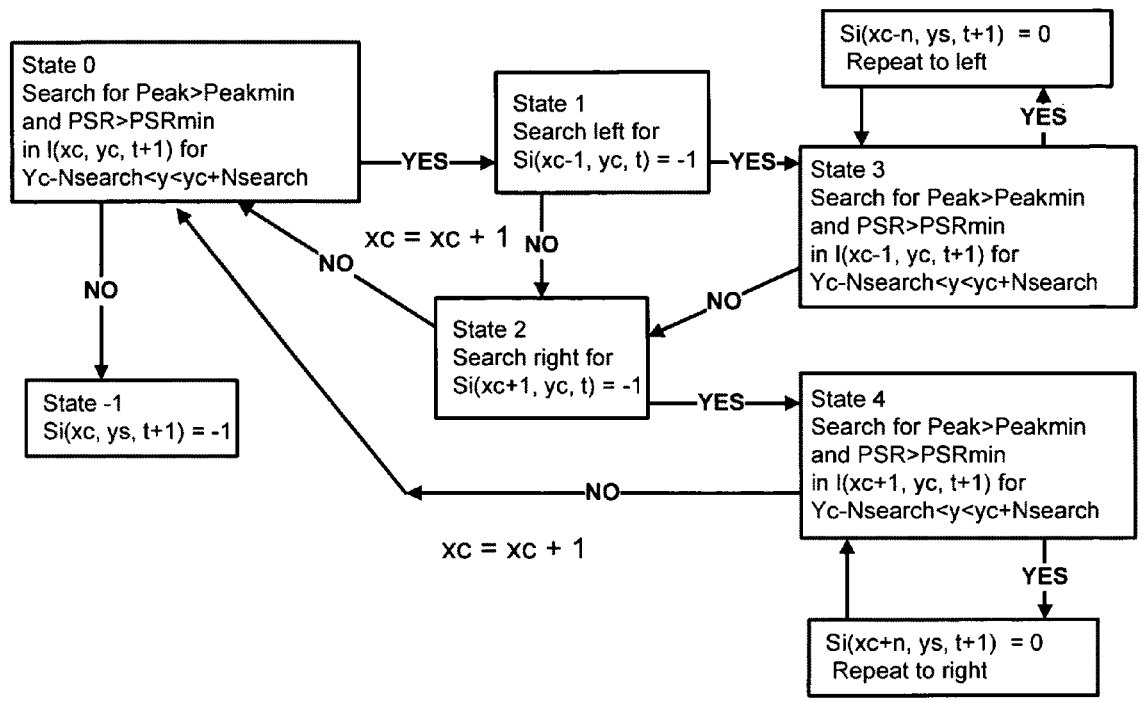

FIG. 13 diagrammatically represents a HOLD state machine 150, by way of example.

DESCRIPTION DETAILING FEATURES OF THE INVENTION

By viewing the figures incorporated below, and associated representative embodiments, along with technical materials outlined in as ATTACHMENTS, one can further appreciate the unique nature of core as well as additional and alternative features of the new system and associated technique for negotiating with a buyer. Back-and-forth reference and association will be made to various features identified in the figures—whether incorporated into text of the EXAMPLES.

In one aspect, the lock and hold method employs sets of structured light patterns to initially "lock" (or, if chosen "relocked") onto a surface-of-interest and then hold onto temporal deformations. The lock pattern is used to determine the surface depth map of the surface-of-interest. The depth map acquired during lock, is used as a starting point for the hold pattern. A projected hold pattern is tracked for temporal deformations.

Lock patterns include those described in the section A3, below, coupled with certain strategies set forth in the section A5.

Hold patterns are preferably single patterns, as described below in the section A6.

Hold strategy of defining snake state machines is described in the section A7.

Synchronous and Asynchronous operation is set forth in the section A4.1.

Static and Dynamic Lock and Hold SLI is outlined in the section A4.2.

The concept referred to as the "Technology Matrix" strategy encompasses the use of component technology and software that is commodity-accessible, based on established standards. There is a need for a system that is versatile and can be flexibly reconfigured for a wide range of applications, scanning scales, performance and cost levels. The new system is adapted for re-configuration based on a desired performance level(s) without substantial change in core programming or component design. System performance can be further enhanced by upgrading one or more of the camera, projector, and computer-processing components.

Turning, first, to the high-level diagram in FIG. 1A depicting a 'static' L&H technique 10, two distinguishing 'phases' of the technique have been labeled: LOCK 12 and HOLD 14. In this representation of one aspect of the 3-dimensional image acquisition method of the invention, a static surface-of-interest (i.e., at rest with respect to at least one camera such as that at 36, 66) of an Object (animal or inanimate) under observation by at least one camera (e.g., FIGS. 3 and 5 at 35, 65) is illuminated with structured light to obtain initial "LOCK" depth map data or information about the surface-of-interest. A hold pattern comprised of several snake-stripes is then projected at the surface-of-interest using a projector (e.g., FIGS. 3 and 5 at 37, 67). Note that FIGS. 3 and 5 are 'cross-sectional' schematic views through the "Object" (represented by way of example only, as an oval) having an outer surface-of-interest facing the camera 36, 66 so that it is within the field-of-view 35, 65 thereof. For each snake-stripe of a 'HOLD' pattern being projected on a static surface-of-interest (see FIG. 12 at 142, for example, of a bust of a head), an initial identity is assigned and correlated with an initial whereabouts of that snake-stripe's pixels at a particular (initial, or subsequent if performing a re-LOCK) time-frame. This is referred to as part of LOCK (or re-LOCK, if being done) step 12; thus, each initial HOLD pattern snake-stripe is LOCKED.

Next, while projecting the HOLD pattern 14, the snake-stripes are tracked, from frame-to-frame, to acquire the 3-dimensional image. Most likely, the surface-of-interest is in-motion during this tracking of the plurality of snake-stripes. Note that, to save time, the process of assigning identities to snake-stripes (during LOCK 12) can be done generally simultaneously by a computer processor unit.

After a period of time has passed of said tracking (as noted at the bottom of FIG. 1A) a re-LOCK can be performed to reset the depth map data of the surface-of-interest for which a 3D image is being acquired. This can include: illuminating the surface-of-interest with structured light to obtain subsequent depth map data therefor; and, while projecting said hold pattern at the surface-of-interest, assigning a subsequent identity to and subsequent re-lock position of each of the HOLD pattern's snake-stripes. The subsequent re-lock position for each respective snake-stripe preferably includes information concerning the subsequent whereabouts of pixel placement and a subsequent time-frame of that snake-stripe; whereby the assignment of the identity to, and re-lock position of, each snake-stripe during a re-LOCK occurring generally simultaneously.

FIG. 1B depicts the concept of ambiguity that is encountered when projecting structured light on a surface-of-interest from which one is attempting to acquire image information: at left, from the instant viewing angle, the lines (light and dark stripes) match up to appear as if there exists a step-edge; at right, from a different view of the same surface-of-interest, one can see it is—in fact—a ramp-up with ramp-down surface.

FIG. 2 is a high-level diagram depicting an alternative L&H technique of the invention: Temporal and Spatial Dynamic Lock and Hold (L&H) 20. Depending upon the type of motion of the surface-of-interest within the camera field-of-view, FOV, 22a (see also FIG. 3 at 35 and FIG. 5 at 65), a different resolution of illumination with structured light in LOCK may be preferred. For example, where object is initially static/at rest, high resolution illumination may be done to get a depth map of the surface-of-interest, and for a slow-moving surface-of-interest, a medium resolution illumination of the object may be performed, prior to entering HOLD 14 and tracking the HOLD pattern snake-stripes.

FIGS. 3 and 4 are high-level diagrams depicting yet another L&H technique alternative applicants have labeled a Shuttered Lock and Hold (L&H): FIG. 3 depicts system components 30 employed to implement method 40 (FIG. 4) for 3-dimensional image acquisition of a surface-of-interest using structured light illumination. A HOLD pattern originating from projector 37 is projected at an Object. The HOLD pattern is covered by a shutter-cover 34 which is moved in the direction shown by the arrow to 'open' shutter-cover 34, thus, revealing/illuminating the Object's surface-of-interest each of the snake-stripes of the pattern, in sequence, one at a time. The first exposed snake-stripe to illuminate the surface of interest is identified (bottom of the row of dots, each of which represent a cross-sectional snake-stripe) with the top few dots representing the last snake-stripes to illuminate the object's surface-of-interest. As mentioned elsewhere, note that FIGS. 3 and 5 are 'cross-sectional' schematic views through the Object (represented as an oval, for example) having its surface-of-interest facing the camera 36, 66 so that it is within the field-of-view 35, 65 thereof. With the surface-of-interest positioned within a region 35 under observation by camera 36, the shutter-cover can then be engaged (or opened) to reveal each snake-pattern, in sequence, permitting illumination thereof on the surface.

As each snake-stripe illuminates the surface-of-interest, an identity can be correlated with that snake-stripe's position and a frame/time-frame, thus, LOCKing each such snake-stripe. Once a respective snake-stripe has been so LOCKed, it is tracked from frame-to-frame as while the next, sequential, snake-stripe is revealed/exposed to illuminate the surface-of-interest, this next snake-stripe likewise being tracked thereafter from frame-to-frame as the next, sequential, snake-stripe of the HOLD pattern is revealed/exposed to illuminate the surface, and so on. For reference purposes, the region identified at 38 encompasses the intersection of the camera's FOV 35 with the projection area of the HOLD pattern. The surface-of-interest may be in-motion during the period of time the HOLD pattern is projected (for example, if the object is an animal face, the movement may include facial expressions, whether or not the object itself—animal's head—is in-motion). As one will appreciate, the LOCKing of snake-strips will generally occur in a sequential manner, since illumination by a snake-stripe of the surface-of-interest will occur sequentially.

FIGS. 5 and 6 are high-level diagrams depicting yet another L&H technique alternative applicants have labeled Object-Shuttered Lock and Hold (L&H): FIG. 5 depicts system components 50 employed to implement method 60 (FIG. 4) for 3-dimensional image acquisition of a surface-of-interest using structured light illumination. A hold pattern comprised of several snake-stripes is projected into region 68, which is also under observation by a camera 66. As the surface-of-interest moves into region 68 (as depicted, the surface of the oval representing an Object is shown in three positions, moving from left-to-right) it is first illuminated by the bottom, or 'lead', snake-stripe. The first snake-stripe to illuminate the surface of interest is represented by the bottom 'lead' dot (which represents a cross-section of the lead snake-stripe) shown as the middle oval in FIG. 5. As each snake-stripe illuminates the surface-of-interest, it is assigned an identity which is correlated with a LOCK position (e.g., this information can include both the whereabouts of that snake-stripes pixels, as well as a frame/timeframe for the illumination). After being LOCKed, each snake-stripe in the sequence is tracked from frame-to-frame while the surface-of-interest passes through region 68. As one can appreciate, in this case, the surface-of-interest is in-motion while the HOLD pattern is projected and snake-stripes are tracked. The assignment of an identity to LOCK a respective snake-stripes is done by the processor in a generally sequential manner before each enters its tracking during that snake-stripe's HOLD phase.

Figure 7:
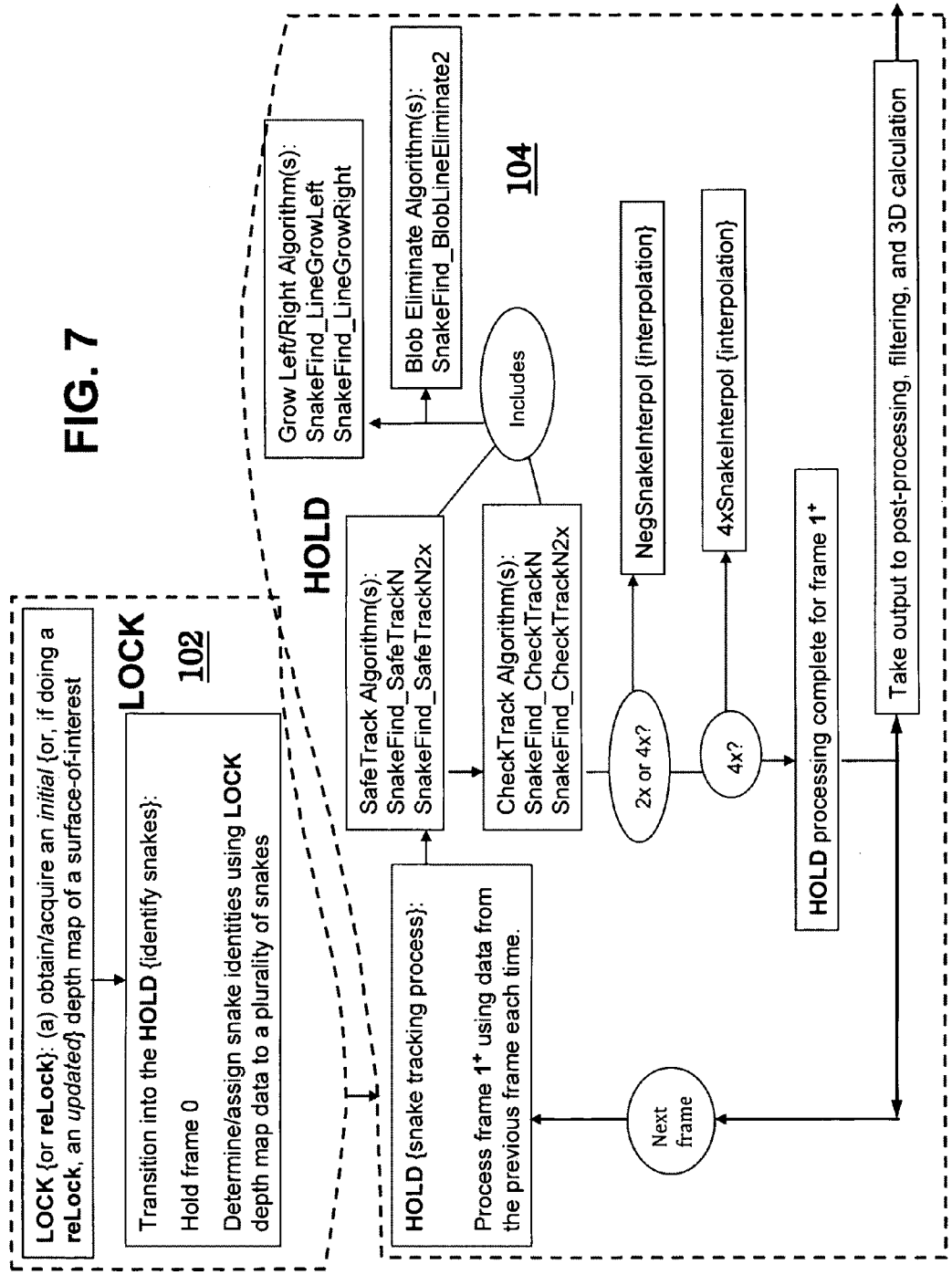
FIG. 7 is a high-level system schematic representing interoperation of several unique subroutines and technique features—core as well as further unique features—woven together to illustrate applicants' LOCK (102) and HOLD (104) method/technique 100.

FIG. 7 is a high-level system schematic representing inter-operation of several unique subroutines and technique features—core as well as further unique features—woven together to illustrate applicants' LOCK (102) and HOLD (104) method/technique 100.

Figure 8:
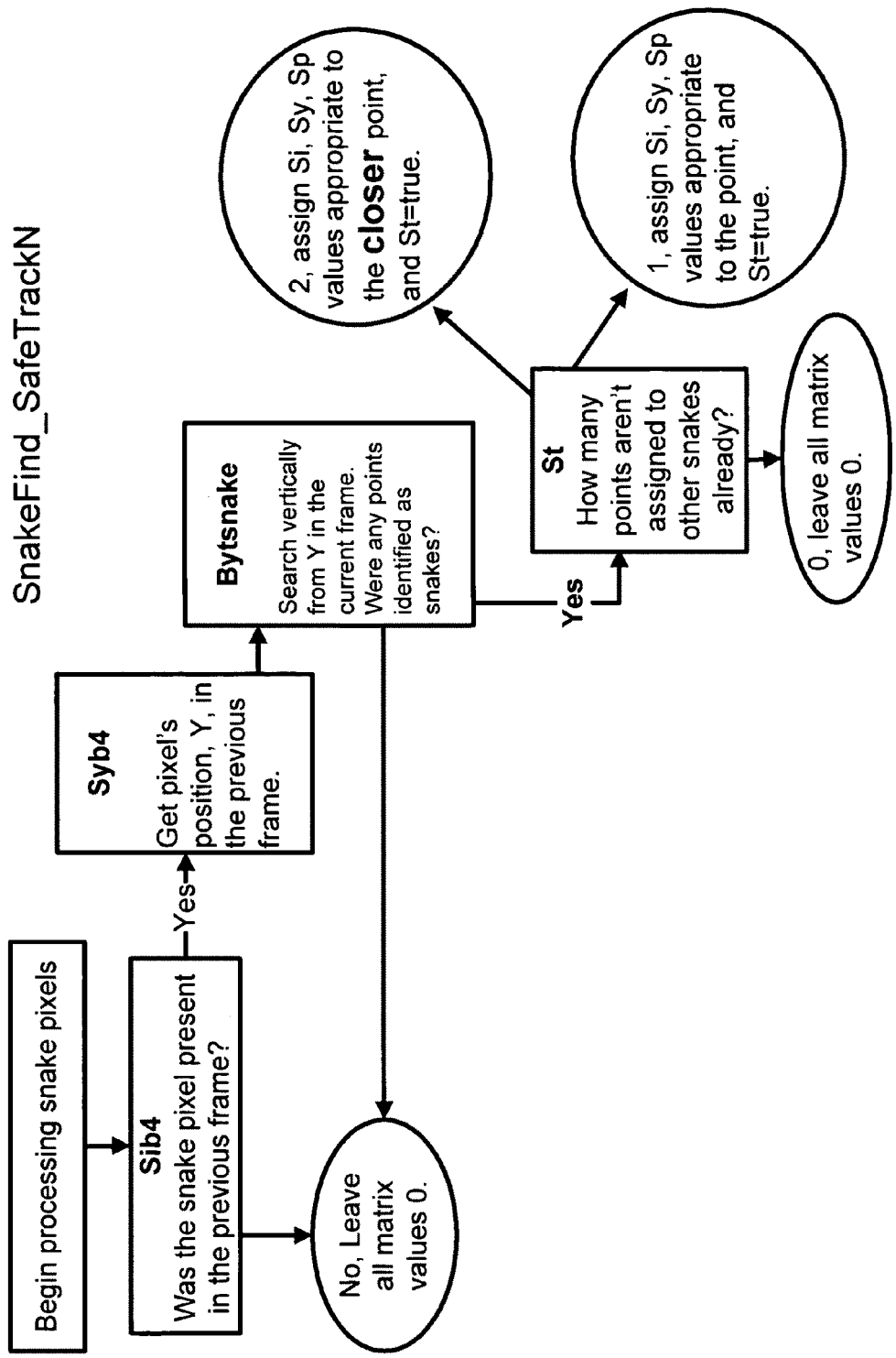
FIG. 8 is a high-level flow diagram representing features of subroutine 70 referred to, for simplicity and consistency herethroughout: SnakeFind_SafeTrackN (see, also, EXAMPLE 02).

FIG. 8 is a high-level flow diagram representing features of subroutine 70 referred to, for simplicity and consistency here-throughout: SnakeFind_SafeTrackN (see, also, \*\*EXAMPLE 02\*\*).

Figure 9:
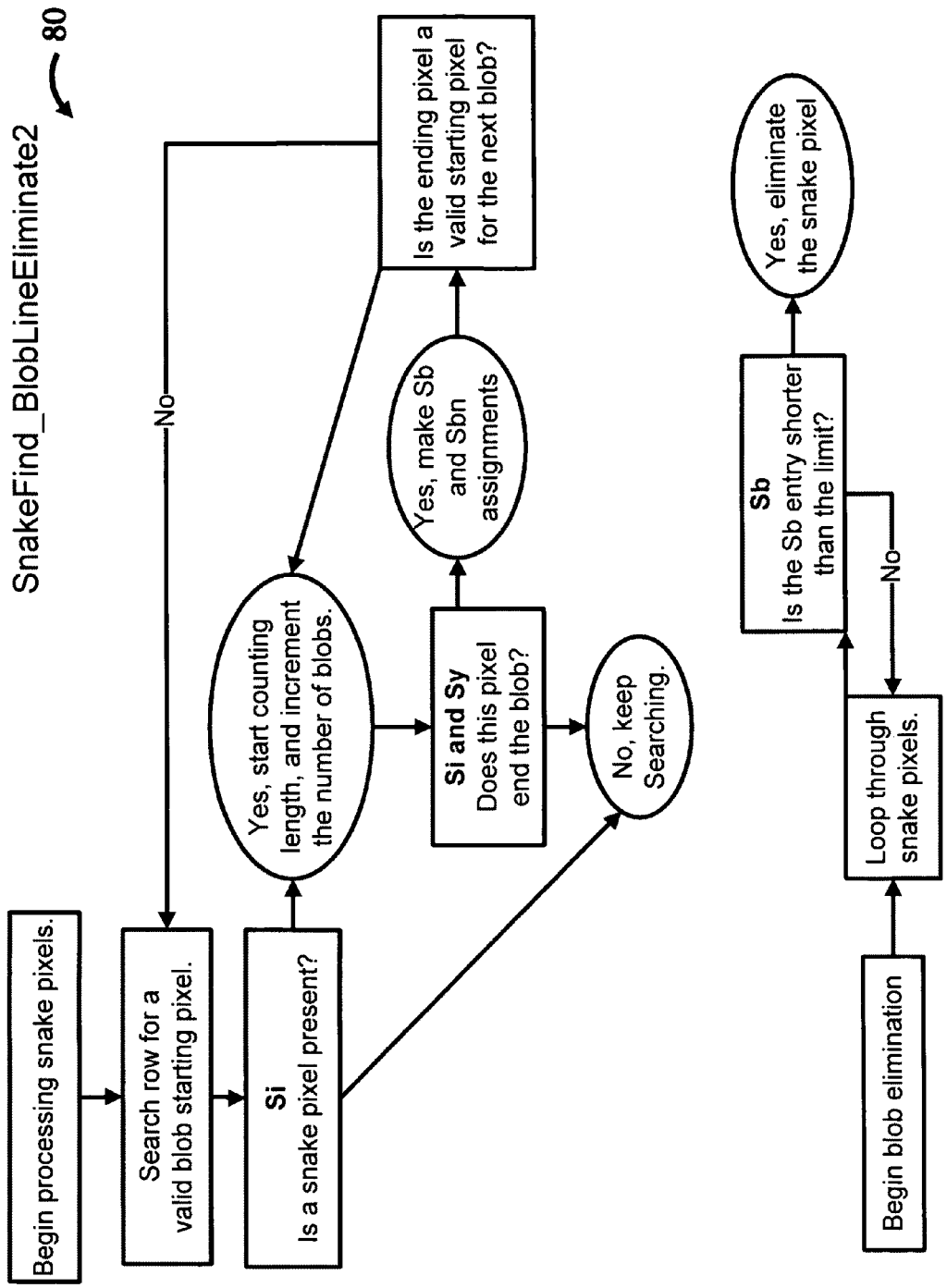
FIG. 9 is a high-level flow diagram representing features of subroutine 80 referred to, for simplicity and consistency herethroughout: SnakeFind_BlobLineEliminate2 (see, also, EXAMPLE 02).

FIG. 9 is a high-level flow diagram representing features of subroutine 80 referred to, for simplicity and consistency here-throughout: SnakeFind_BlobLineEliminate2 (see, also, \*\*EXAMPLE 02\*\*).

Figure 10:
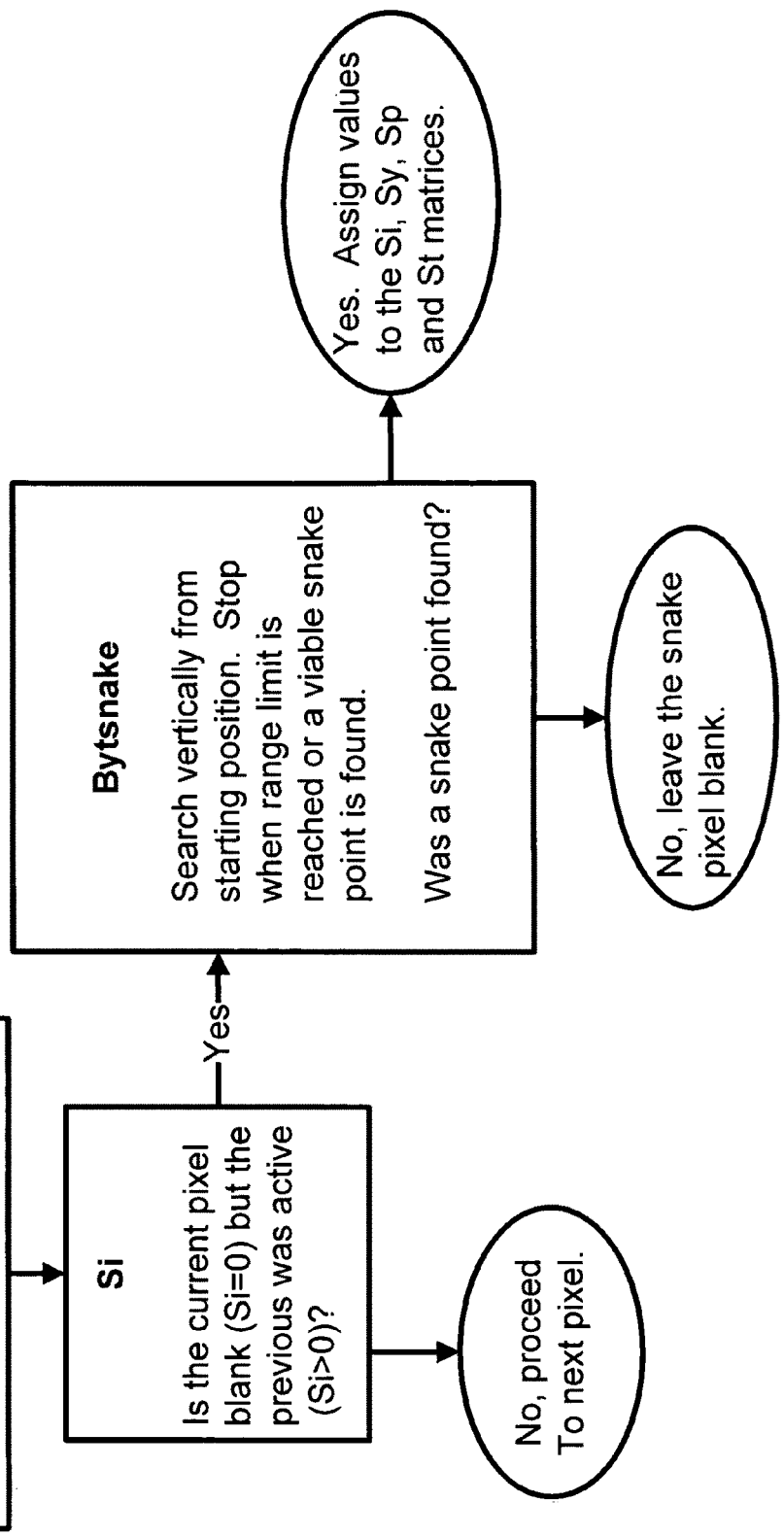
FIG. 10 is a high-level flow diagram representing features of subroutine(s) 90 referred to, for simplicity and consistency herethroughout: SnakeFind_LineGrowLeft and SnakeFind_LineGrowRight (see, also, EXAMPLE 02).

FIG. 10 is a high-level flow diagram representing features of subroutine(s) 90 referred to, for simplicity and consistency herethroughout: SnakeFind_LineGrowLeft and SnakeFind_LineGrowRight (see, also, \*\*EXAMPLE 02\*\*).

FIG. 11 graphically represents certain concepts of the sub-routines of \*\*EXAMPLE 02\*\*

FIG. 12 is a computer-generated/implemented "raw image" 140 of the bust of a head—shown on its side—comprising many stripes; each stripe 142 represents the concept of one "snake". By way of example, in connection with the shuttered techniques depicted by FIGS. 3, 4, 5, and 6: many snakes are employed, whereby LOCK is performed by introducing one new snake at a time, either by opening a shutter (FIGS. 3 and 4) or by moving the object into the projected pattern space (FIGS. 5 and 6).

FIG. 13 diagrammatically represents a HOLD state machine 150, by way of example.

A3. Multi-Pattern and Single-Pattern Structured Light Illumination ("SLI")

Multi-pattern SLI methods require two or more patterns to achieve a 3-D surface acquisition. Most of these methods produce a "phase" response along the phase dimension which, coupled with camera coordinates, is mapped to world coordinates. Multi-pattern techniques can address certain issues with SLI:
1. Increase SNR and thus achieve arbitrarily high depth resolution.
2. Achieve non-ambiguous depth measurement over longer ranges.
3. Insensitive to ambient light interference.
4. Insensitive to surface shading or color.

A3.1 Four or More Pattern SLI

These methods include:

Laterally Shuttered patterns: "Lateral shuttered" refers to starting with an empty, possibly black pattern, then sliding, or uncovering a pattern, in the phase direction, similar to the way a sliding shutter would. The advantage of this is that the leading edge of the shutter is non-ambiguous and thus each component pattern can be identified independent of the target surface shape and depth. This is particularly advantageous since the shuttering can be done using a mechanical device thereby reducing costs associated with digital projection devices. Another use is this is to span a scan volume such that as a moving target object enters the space, the pattern automatically moves into view, thereby shuttering, as the object moves through the illuminated space.

Laterally shifted patterns: "Laterally shifted" refers to moving a single pattern laterally along the phase dimension. The most common method is Phase Measuring Profilometry (PMP). In PMP the patterns are sine waves and added depth resolution is achieved by having groups of PMP patterns at increasing frequencies. This is referred to as multi-frequency PMP. Another method of laterally shift is to replace the sine waves with triangle waves or trapezoidal waveforms. In the case of trapezoidal waveforms, three patterns are used for each spatial frequency. PMP and triangle waveforms can also be reduced to 3 patterns but typically are more and with modulus 4 patterns the patterns sum yields an estimate of albedo.

Successive Frequency modulation: By using different frequencies in each pattern, the frequencies can be chosen to yield unique pixel values along the phase dimension.

Successive boundary subdivision (SBS): SBS was introduced by Hassebrook, et al. in 1997. It begins with a single stripe defining a boundary that subdivides the capture image into two regions. In the next frame, each of the two regions is then subdivided by a stripe and this process continues until some maximum number of boundaries have been achieved. The purpose of the subdivision is to recover a non-ambiguous assignment of the final boundaries or stripes. Patterns other than stripes can be used to aid in the definition of the boundaries using this concept.

Spatial encoding: The most common spatial encoding method is the gray-code pattern set. The idea of the gray code is that no edges in any combination of two patterns, occur at the same position in the camera space. The number of patterns is limited by the final depth resolution required.

Color encoding: There are many color encoding techniques but we limit this example to ones that are relatively independent of surface color. In this case, a method like multi-frequency PMP, in particular 3 frequency, may be encoded into the RGB pixel space where R may contain the base frequency of kc=1 and G and B would contain the pattern sequence for higher frequencies. Since PMP is insensitive to color, then within each color space, the reconstructed phase result would also be insensitive to the surface color and albedo.

A3.2 Three Pattern SLI Encompass:

Ambiguous or phase wrapped methods: If a single object is being scanned and with blob analysis that object is composed of a single blob, then it is possible to use Laterally Shuttered, Laterally Shifted, SBS, Spatial Encoded and Color Encoded patterns to achieve non-ambiguous reconstruction. However, multiple blobs would result in ambiguous surface reconstruction.

Three pattern PMP: The minimum number of patterns required for PMP is three. Triangle waves or trapezoidal waveforms are also used for 3 pattern SLI. The trapezoidal method is particularly ideal for 3 pattern combinations.

Successive Frequency modulation: By using different frequencies in each pattern, the frequencies can be chosen to yield a unique pixel values along the phase dimension.

A special case of the triangle method is the 3 pattern Gradient Method (GM). The 3 patterns are (1) all "white" pattern for albedo recovery, (2) positive gradient intensity ramp from minimum to maximum intensity and (3) a negative gradient ramp intensity. By using the white pattern as a reference, the largest of the positive or negative ramp is used to determine the phase value of particular point.

Composite Pattern: Composite pattern is a very unique technique developed by Hassebrook et al.

Color encoding: Typical color coding is limited to 3 colors R, G and B but theoretically may include a large number of spectral components. Herein, the discussion has been simplified by limiting it to 3 color channels then any 9 pattern combination can be used with color encoding.

A3.3 Dual Pattern SLI Encompass:

A special case of the triangle method is the 2 pattern Gradient Method. The 2 patterns are (1) positive gradient intensity ramp from minimum to maximum intensity and (2) a negative gradient ramp intensity. By using the sum of the two patterns as a reference, the largest of the positive or negative ramp is used to determine the phase value of particular point.

Composite Pattern: Composite pattern is a very unique technique developed by Hassebrook et al.

Successive Frequency modulation: By using different frequencies in each pattern, the frequencies can be chosen to yield a unique pixel values along the phase dimension.

Color encoding: Typical color coding is limited to 3 colors R, G and B but in theory can include a large number of spectral components.

A3.4 Single Pattern SLI Encompass:

A special case of the triangle method is the 2 pattern Gradient Method. The 2 patterns are (1) positive gradient intensity ramp from minimum to maximum intensity and (2) a negative gradient ramp intensity. By using the sum of the two patterns as a reference, the largest of the positive or negative ramp is used to determine the phase value of particular point.

Composite Pattern: Composite pattern is a very unique technique developed by Hassebrook et al.

Multi-Frequency patterns: By using the sum of different frequencies chosen not to be integer multiples of each other can yield unique pixel values along the phase dimension.

Color encoding: The previous single, dual and three pattern methods can be mapped into 3 color channels.

A4. SLI Tracking Methods or "LOCK and Hold" SLI

The technique for tracking object motion from a "Lock" to "Hold" state has origin in RF (radio communications) tracking technology. If lock onto an RF frequency can be achieved then a hold state may be maintained over a wider range of motion than the original locking state.

A4.1 Synchronous and Asynchronous Lock and Hold SLI

The tracking can be done in a synchronous manner between the camera and Projector or asynchronously to increase the acquisition speed to that cost of pattern identification and transition. With the aid of a calibration target, the Lock pattern sequence can be more accurately tracked without the need of synchronization.

A4.2 Static and Dynamic Lock and Hold SLI

A Static Lock and Hold SLI pattern sequence is predetermined prior to projection. The static Lock and Hold SLI can be synchronous or asynchronous and can be processed on line or off line. In contrast, a Dynamic Lock and Hold SLI pattern sequence must be processed on line and can be dynamically changed or optimized for temporal changes in the scene being scanned. In the dynamic case, the pattern sequence can also be modified during the scan based on spatial segmentation of the scene. In this case, multiple objects can be scanned with totally different pattern sequences. Another aspect of dynamic Lock and Hold SLI is that the transition in and out of Lock and Hold sequences can be done to optimize for maximum lateral and depth resolution of dynamic scene. For example, while scanning facial expressions, the temporal differences can be monitored and if there is no motion, the face can be rescanned in the Lock mode with additional patterns to get a more accurate surface scan. In this regard an adaptive Lock and Hold interaction is used to maximize the overall scene depth resolution.

A5. Lock Strategy

Any of the multi- or single-pattern methods may be employed during LOCK. For example, the transition from lock to hold is attained as:

PMP: Use minimal number of patterns to determine the snake identity. During the calibration process the phase corresponds to a projector row. From this we can estimate the phase value of each snake. Thus, if we know the snake then we know the phase for a given xc, yc coordinate.

SUCCESSIVE BOUNDARY SUBDIVISION: Use SBS to determine the phase value associated with the snakes.

COMPOSITE PATTERN: Use CP to determine course estimate of phase.

A6. Hold Strategy

The HOLD patterns can be ambiguous and typically higher in frequency with trackable structures. Examples of such patterns include:

MULTI-STRIPE: Includes single patterns that contain periodic functions along the phase direction. These patterns may be binary stripes, sine waves, etc.

HIGH FREQUENCY COMPOSITE PATTERN: CP with higher frequencies for PMP.

COLOR MULTI-STRIPE ENCODING: Use color encoding to widen non-ambiguity range and thus increase stripe resolution. Consider 3 colors $\{r,g,b\}$, if we consider binary combinations then we have 8 possible values from 3 bits. Typical combinations are ones where there are at least 2 bits so that the total light level is high enough. In this case there would be $\{r,g\}$, $\{r,b\}$, $\{g,b\}$ or three possibilities. Along this same line of thought let the total intensity be 1 then we could have $\{r/3,g/3,b/3\}$, $\{r\},\{r/2,g/2\},\{g\},\{g/2,b/2\},\{b\}$ or 6 possibilities. If there is prior knowledge of the surface color, then compensation can be built into the color intensities to equalize the response.

COLOR COMPOSITE PATTERN: One way of doing color composite pattern is to use each color to channel a CP that has different frequency PMP patterns. Another twist on this is to separate each modulated carrier signal by color. For example, to counteract roll off, on a human finger, use the red channel for the high frequency so that the higher red response will compensate for the roll off.

COLOR PMP: Color PMP uses each color for a different phase shift. One of the problems with this is the variation of color response due to the surface color. Thus, like most color modulation techniques, the surface color must be known and corrected for.

COLOR PERIODIC WAVE FORM: We can use color modulation as way modulating the amplitude received by either a black and white camera or a color camera. For example, if we know that the reflectance response for red is r, the response for green is g and for blue is b, then a sinusoidal can be represented by $z=a1\ r+a2\ g+a3\ b$ where the convex hull is defined by $1=a1+a2+a3$.

A7. Snake Design

In the multi-stripe HOLD strategy, snakes (light stripes) are tracked. Each active pixel in a "snake" is considered a state machine (for example, see FIG. 13). The camera image is I(xc, yc, t). For example, consider the nth snake. Four matrices represent a snake. The first matrix is the snake color Sc(xc, ys) where ys=0, 1, (Ns−1) is the snake identity and xc is the pixel corresponding to the camera space and t is the tth frame number. In the case of a B&W camera a snake color could be 0 for a positive snake and 1 for a negative snake. For a color camera the color may be 0=red, 1=green, 2=blue and 3=white, etc. Discussion is limited here for purposes of simplicity, to the B&W (black & white) video/motion picture example. The positive snake is one where the camera image is positive and the negative is where the camera image is negative. The second matrix contains the intensity or RGB color of the snake peaks and is Sp(xc, ys, t). A third matrix is the camera position yc=Sy(xc, ys, t) and the fourth matrix is the state matrix where Si(xc, ys, t)={−1,0,1,2} where −1 is "not valid", 0 is "searching vertical window", 1 is "valid and search left if left pixel is invalid", 2 is "valid and search right if right pixel is valid". The quality matrix allows the snakes to segment.

A7.1 Initializing Snake Matrices from Phase Information

Before snake tracking in the hold process begins, the first HOLD frame snake matrices are initialized. For example, assume a phase response yp(xc,yc) and the first hold image containing snakes is I(xc,yc,t=0). The projected snake pattern can be represented in projector coordinate as yproj=aps ys+bps, where ys is the snake number from 0 to Ns−1. In order to map the snake peaks to the correct snake index, we need to map from the associate phase to ys. For example, assume we find a peak location at {xc,yc}. One then finds the phase at this same coordinate yp(xc,yc).

A7.2 Snake Tracking

Turning to FIG. 13, a tracking process 150 is represented and depicted as a state machine for identified SNAKES, labeled states State −1, State 0, and States 1-4 are described below. Implementation of process 150 is further depicted, using three subroutines represented as pseudo-code. The snake ys states are defined for the xc snake pixel as:

STATE −1: Invalid pixel.

STATE 0: Search for snake peak in frame t+1 of I(xc, yc, t+1) where yc=Sy(xc, ys, t) such that we assume the snake may move only yc+/− Nsearch pixels. The constraints on the search is that the peak value be above 5 min and that the Peak to Sidelobe Ratio (PSR) be above PSRmin. The PSR is defined by the peak divided by the maximum value at either ycmax+dy or ycmax−dy where 2dy is chose to be the snake width. If the peak value is not above 5 min or the PSR is not above PSRmin then the snake pixel is low quality and Si(xc, ys, t+1)=−1. If the peak and PSR are satisfied then go to State 1 or Si(xc, ys, t+1)=1;

STATE 1: Snake is valid for time t+1, that is, Si(xc,ys,t+1)= 0. Test to see if snake is an edge snake by checking Si(xc−1, ys,t+1)=−1? If Si(xc−1,ys,t+1)=−1, then we go to State 3.

STATE 3: In State 3, the snake segment is extended to the left by finding the values in the range of yc+/−Nsearch in I(xc−n, yc, t+1) where n=1, 2, . . . etc. If the peak and PSR satisfy the 5 min and PSRmin thresholds then the snake segment in t+1 is extended by that pixel. That pixel then goes into state 0. The process is continued to the left until either the state is not −1 or the proper peak is not found. The position is then set back to the original xc and the process goes to state 2.

STATE 2: Snake is valid for time t+1, that is, Si(xc, ys, t+1)=0. STATE 3 has been processed. Test to see if snake is an edge snake by checking Si(xc+1, ys, t+1)=−1? If Si(xc+1, ys, t+1)=−1, then we go to State 4.

STATE 4: In State 4, the snake segment is extended to the right by finding the values in the range of yc+/−Nsearch in I(xc+n, yc, t+1) where n=1, 2, . . . etc. If the peak and PSR satisfy the 5 min and PSRmin thresholds then the snake segment in t+1 is extended by that pixel. That pixel then goes into state 0. The process is continued to the right until either the state is not −1 or the proper peak is not found. Once finished the next snake pixel is evaluated if not already.

Implementation of the state machine is demonstrated by three pseudo code functions. Given that the lock process yields the identity of all snakes in first hold image, the snake tracking begins. That is, we know $Sc(x_c, y_s)$, $Sp(x_c, y_s, t)$, $Si(x_c, y_s, t)$, $Sy(x_c, y_s, t)$ and the next image $I(x_c, y_c, t+1)$. From these we will determine $Si(x_c, y_s, t+1)$, $Sp(x_c, y_s, t+1)$ and $Sy(x_c, y_s, t+1)$.

```
First, repeak all valid snake points in frame t and if valid place new yc location to snake matrix in frame
t+1.
REPEAK ALL VALID SNAKE PIXELS
Initialize Si(x_c,y_s,t+1) = −1 for all { x_c,y_s }
LOOP YS: Loop through ys from 0 to Ns−1
    LOOP XC: Loop through xc from 0 to Nx−1
        Apply the state machine at each {xc,ys} point in the t frame.
        Test state values Si(x_c,y_s ,t) for a state
        State −1: Not a valid pixel so go to CONTINUE XC
        State 0,1,2: Starting at yc=Sy(x_c,y_s,t), search I(x_c,y_c+dy,t+1) for peak where -
        Nsearch<dy<Nsearch. If a valid peak is not found, go to CONTINUE XC else
            Sp(x_c,y_s,t+1)=I(x_c,y_c,t+1), Sy(x_c,y_s,t+1)=yc and Si(x_c,y_s,t+1)=0.
    CONTINUE LOOP XC:
CONTINUE LOOP YS:
{One approach is to take the snake segments and label the ends as 1 for left end and 2 for right ends. If a
lone snake pixel exists, it may be filtered out to prevent unwanted drift.}
LABEL SNAKE SEGMENT ENDS
LOOP YS: Loop through ys from 0 to Ns−1
    LOOP XC: Loop through xc from 0 to Nx−1
        Apply the state machine at each {xc,ys} point in the t+1 frame.
        Test state values Si(x_c,y_s,t+1) for a state
        State −1: Not a valid pixel so go to CONTINUE XC
        State 0:
            Test for end left pixel
            If Si(xc−1,ys,t+1)=−1 then Si(x_c,y_s,t+1)=1
            Test for right end pixel
            If Si(xc+1,ys,t+1)=−1 then Si(x_c,y_s,t+1)=2
            Filter out single points
            If Si(xc−1,ys,t+1)=−1 AND Si(xc+1,ys,t+1)=−1 then Si(x_c,y_s,t+1)=−1
    CONTINUE LOOP XC:
CONTINUE LOOP YS:
{With the snake ends labeled, the pixels to the left or right of them in frame t+1 can be peaked to grow
snakes. The process is repeated until snakes no longer grow.}
LOOP UNTIL SNAKES STOP GROWING (must check for out of bounds in xc direction)
LOOP YS: Loop through ys from 0 to Ns−1
    LOOP XC: Loop through xc from 0 to Nx−1
```

-continued

```
Apply the state machine at each {xc,ys} point in the t+1 frame.
Test state values Si(x_c,y_s,t+1) for a state
State -1 OR 0: Not an end pixel so go to CONTINUE XC
State 1: REPEAK to the left. Start at xc-1, yc=Si(x_c,y_s,t+1)
    If peak is valid and Si(xc-2,ys,t+1)=-1,
    then Si(x_c,y_s,t+1)=0, Si(xc-1,ys,t+1)=1, Sy(xc-1,ys,t+1)=yc peak
    If peak is valid and Si(xc-2,ys,t+1)=0 or 2,
    then Si(x_c,y_s,t+1)=0, Si(xc-1,ys,t+1)=0, Sy(xc-1,ys,t+1)=yc peak AND Si(xc-
    2,ys,t+1)=0
    if peak is valid, Sp(xc-1,ys,t+1)=I(xc-1,ys,t+1);
State 2: REPEAK to the right. Start at xc+1, yc=Si(x_c,y_s,t+1)
    If peak is valid and Si(xc+2,ys,t+1)=-1,
    then Si(x_c,y_s,t+1)=0, Si(xc+1,ys,t+1)=2, Sy(xc+1,ys,t+1)=yc peak
    If peak is valid and Si(xc+2,ys,t+1)=0 or 1,
    then Si(x_c,y_s,t+1)=0, Si(xc+1,ys,t+1)=0, Sy(xc+1,ys,t+1)=yc  peak  AND
    Si(xc+2,ys,t+1)=0
    if peak is valid, Sp(xc+1,ys,t+1)=I(xc+1,ys,t+1);
CONTINUE LOOP XC:
CONTINUE LOOP YS:
CONTINUE GROWING
{Once there is no longer change in the snake segments, the frame index is incremented and the entire
process starts over.}
```

A9. Background REFERENCES Authored by at Least One or More of the Applicants Hereof:
(1) Veera Ganesh Yalla and L. G. Hassebrook, "Very-High Resolution 3D Surface Scanning using Multi-Frequency Phase Measuring Profilometry," Edited by Peter Tchoryk, Jr. and Brian Holz, SPIE Defense and Security, Spaceborne Sensors II, Orlando, Fla., Vol. 5798-09, (Mar. 28, 2005).
(2) L. G. Hassebrook, Ray C. Daley and William Chimitt, "Application of Communication Theory to High Speed Structured Light Illumination," Edited by Harding and Svetkoff, SPIE Proceedings, 3204(15), 102-113 (October 1997).
(3) L. G. Hassebrook, Daniel L. Lau and Chun Guan, "System and Technique for Retrieving Depth Information about a surface by projecting a Composite Image of Modulated Light Patterns," U.S. patent application Ser. No. 10/444,033.
(4) D. S. Goodman and L. G. Hassebrook, "Surface Contour Measuring Instrument," IBM Technical Disclosure Bulletin, 27(4B), 2671-2673, (December 1984).

The high-level system schematic in FIG. 7 represents interoperation of elements and features of a system employed to carry out the invention. This diagram shows interoperation of several unique subroutines and technique features—core as well as further unique features—woven together to illustrate applicants' LOCK (102) and HOLD (104) method/technique.

Features of the invention depicted in the drawings further include, Without limitation those set forth in the following EXAMPLES 01 and 02:

Example 01

By way of example, only, detailed description of an implementation is set forth, below, to illustrate functionality contemplated hereby (for further reference, refer to the high-level flow diagram, FIG. 7, as well as subroutine diagrams labeled FIGS. 8-10).

Lock and Hold (L&H) incorporates in a very unique way into Structured Light Illumination (SLI), conventional Phase Lock Loop (PLL) of radio communications. In L&H, two states of tracking a signal/pattern are employed: LOCK (12, 102) and HOLD (14, 104). L&H is used to acquire 3-Dimensional surface scans of objects (a surface-of-interest of an object) in motion. LOCK is performed to initially determine the surface; preferably done when the surface is stationary (Static Lock, FIG. 1A), moving slower than the hold process (Multi-level Motion Lock, FIG. 2), or having the snakes exposed to the object one at a time with a sliding shutter (Shuttered L&H SLI, FIGS. 3-4); or having the object enter the scan volume (SV) region (Object Shuttered L&H SLI, FIGS. 5-6). L&H technique can also be applied-spatially to the SV which is Dynamic L&H SLI. During LOCK, each snake, in the beginning of a HOLD sequence, Without depth ambiguity (ambiguity is depicted in FIG. 1B), is assigned an identity. Once identified, the snake is tracked through subsequent frames during HOLD. The snake identity corresponds with the position of the snake stripe in the projector pattern and when the camera coordinates are combined with a snake identity (i.e. the projector coordinate or pattern stripe), the world coordinates of that point can be found via conventional triangulation geometry (explained in ATTACHMENTS A, B, C)

STATIC LOCK and HOLD. See, also, FIG. 1A and the FIG. 7 overall diagram. Basic structure of L&H is a LOCK 12, 102 followed by HOLD 14, 104 (or tracking subroutine). LOCK represents a non-ambiguous depth map acquisition of the object. Given this initial depth of the pattern, the pattern components, such as "Snakes" are tracked during HOLD process. The LOCK step is slower than HOLD so either the object must move slower, or even stand still, or as in the shuttered technique, the object must enter the Scan Volume in a special way as to allow lock. During HOLD process, one may loose track or loose LOCK at some point if the object moves to fast or to long or has too many ambiguities (typically due to accumulated error). So the system can be re-Locked at any time.

SHUTTERED LOCK and HOLD (L&H). Shuttered L&H 30, 40 (depicted in FIGS. 3 and 4) employs a moving a shutter to expose one snake at a time. The first snake exposed yields its identity and thus the next snake exposed, has its identity known as being the one after the snake before it and so on until all snakes are exposed and identified. It is preferable that the object remain stationary while the snakes are exposed by moving the shutter. Then with the snake identities known, the hold process may follow.

Object-Shuttered Lock and Hold (at 50, 60 in FIGS. 5 and 6) approach does not require the object to vary in speed or motion. The object is required to enter the Scan Volume such that the leading edge of the pattern which accomplishes the non-ambiguous LOCK process. As the pattern covers the object surface each new component of the pattern, such as a "Snake" is locked and then put into a hold state where it is tracked. So new snakes are locked or identified, and then tracking begins with those snakes to hold their identity.

TEMPORAL AND SPATIAL DYNAMIC LOCK and HOLD (L&H) depicted at 20, FIG. 2: SV is monitored for motion. If region goes static, then a high resolution SLI method is used to Lock the region then region is placed in hold state with a hold pattern. If a region is in motion and is not already locked, then the process attempts high resolution lock, followed by faster locks with decreased resolution leading to a hold pattern for tracking the surface in motion.

Example 02

By way of example, only, pseudo code—along with detailed description of several subcomponent processes (in a C++ implementation)—is set forth, below, to illustrate certain functionality of several embodiments contemplated hereby (for overall further reference, refer to the flow diagram of FIG. 7, as well as subroutine diagrams in FIGS. 8-10).
Background: Selected Useful Definitions, by Way of Reference Only, of Terms Used Herein:

Lock—3D scan performed to acquire an initial depth map (or a later-acquired initial depth map, in the case of a "relock") of a surface-of-interest, and assigning an identity to each snake.

Hold—The unique process of capturing 3D motion using a continuously projected "hold pattern" usually consisting of bands of light (with a sinusoidal cross section), to track whereabouts of illuminated stripes referred to as 'snakes'.

A film frame, or just frame, is one of the many single consecutive images in a motion picture or video. Individual frames may be separated by frame lines. Typically, 24 frames are needed for one second of a motion picture ("movie") film.

Frame rate, or frame frequency, is the measurement of the frequency (rate) at which an imaging device produces unique consecutive images ('frames'). The term is used when referring to computer graphics, digital or analog video cameras, film cameras, motion capture systems, and so on. Frame rate is often expressed in frames per second (fps).

Snake—(see, also, FIG. 12) A snake can be visualized as a single pixel thick stripe 142, created by processing the image of the subject illuminated by the hold pattern. In order to provide meaningful results, each snake has an attached identity, consisting of a snake number and phase value (to be used for 3D reconstruction). Snake may also refer to a row when used in the context of a "snake matrix", or to any individual light band in the hold pattern.

Safe—An subroutine is referred to as 'safe' if it actively prevents ambiguous assignment, that is, any given snake pixel is assigned a single-identity only.

Snake Indicator Matrix—Si—A two-dimensional ("2D") matrix of integer values. All entries correspond to snake pixels. Each snake is assumed to have a maximum length equal to the width or height of the original image (depending on the orientations of the stripe pattern and camera). However, many snake pixels will be absent from the image, due to shadows, deletions or other losses, or simply because the snake stripe on the subject was shorter than its maximum possible length. A value of 0 in the Si matrix signifies the absence of a snake, while a value of greater than 0 signifies that a snake is present.

Snake Tracking Matrix—St—A 2D matrix of unsigned character (individual byte) values, used to prevent double assignment. St corresponds to Bytsnake/Bytimage, and thus mapping a snake matrix point to St requires its Sy value (St is the size of the image, rather than the size of the Si matrix, so the position of a snake pixel is defined by the column in the image and the Sy value, rather than column and row as in the other snake matrices).

Snake Y matrix—Sy—A 2D matrix of floats. For each snake pixel, the y value of the corresponding pixel in the original image is kept here. The Y notation is due to the assumption made herein, that the snakes are oriented horizontally across the image.

Snake Phase Matrix—Sp—A 2D matrix of unsigned character values. Each element represents the color in the original image of the pixel identified as a snake pixel.

Bytimage—The bitmap image of the subject before processing.

Bytsnake—The bitmap of the image produced by initial processing. A white pixel (value 255) represents a pixel where a snake has been identified. All other pixels are black (value 0). Position values of a point in bytsnake correspond to the position values of the same point in bytimage.

---

SnakeFind_SafeTrackN - See, also, FIG. 8.

```
void SnakeFind_SafeTrackN(short Nside, short GrowVertRange, short BlobMin,
unsigned char *Sp,unsigned char *Si,float *Sy,unsigned char *St,unsigned char
*Sib4,float *Syb4,short NxSnake,short MySnake,unsigned char *bytimage,unsigned
char *bytsnake,short Nx,short My,BOOL Orientation,short init)
// SnakeFind_SafeTrackN
//      Tracking algorithm, based on the TrackN function.
//      Uses a boolean matrix (St) to ensure that each snake stripe is assigned
only once.
//
// Input Parameters :
//        Nside - Tracking Distance
//        GrowVertRange - Vertical range for left/right snake grow functions
//        BlobMin- Minimum length for any viable snake 'blob'
//        *Sp - Snake phase (color) matrix
//        *Si - Snake indicator matrix
//        *Sy - Snake y value matrix
//        *St - Boolean (unsigned character implementation 0=false, 1=true)
snake assignment matrix
//        *Sib4 - Snake matrix representing the PREVIOUS frame's Si matrix
//        *Syb4 - Snake matrix representing the PREVIOUS frame's Sy matrix
//        NxSnake - Snake width in pixels (usu. corresponds to image width)
//        MySnake - # of snake pixel rows (usu # snakes)
```

| SnakeFind_SafeTrackN - See, also, FIG. 8. |
|---|
| //    bytimage - Pixel intensity values of captured image<br>//    bytsnake - 'Black' and 'White' matrix/image. Values of 255 indicate a snake stripe, 0 indicates not a snake stripe<br>//     Nx - Total image width (ie. width of bytimage/bytsnake)<br>//    My - Total image height (ie. width of bytimage/bytsnake)<br>//    Orientation - Boolean value indicating image orientation.<br>//    init - 1 indicates initialize matrix state, 0 indicates non-initialize state.<br>//     Initialization blanks all Si, Sp, Sy, St matrices, allowing fresh values to be assigned.<br>//-------------------------------------------------------------------- |

The subroutine depicted in FIG. 8 tracks snakes from one image to the next within a given vertical search range. It utilizes the St matrix to prevent multiple assignments of a given snake to any given pixel of bytsnake. In addition to tracking snakes, the subroutine also performs "safe growth" and "blob elimination" processes on a snake-by-snake basis, thereby further decreasing the likelihood of incorrect tracking.

The subroutine performs the following procedure: according to the initialization setting, the subroutine can initialize the Si, Sy, St, and Sp matrices to zero. Then, starting from the upper-left most pixel and progressing row-by-row, the subroutine fills the snake matrices with appropriate values.

For each non-zero entry in the Sib4 matrix (the snake indicator for the previous frame), the subroutine performs a vertical search, limited by the Nside variable, starting from the previously identified snake Y value (that is, the value of Syb4 for the snake pixel indicated by Sib4). The search is performed on the current frame's bytsnake image, searching up and down for a white pixel. The search actually identifies a maximum of two possible snake pixels; the closest snake point above the starting point, and the closest below.

Next, the subroutine considers the "closest above" point, checks to see if it was actually found, then ensures that the point doesn't coincide with a point which has already been identified as a different snake (using the St matrix value of the point). If for either reason the point is not a viable option, the same procedure is performed on the "closest below" point. If however, the point above was a viable point for assignment, the below point is considered for viability. If it is viable AND closer to the starting position than the above point, then it is the assigned point, otherwise, the snake is assigned to the above point.

Once the new snake point is identified, the values required for Si, Sy, St, and Sp can be assigned to the corresponding snake pixel entry. If no viable point is found in the search range, the snake pixel is assumed to be empty for the frame, and all matrix entries are zeroed.

This searching process is repeated for each snake pixel entry along a given row. Once searching through the row is completed, the function calls additional functions, the row-wise growth and blob functions, to further process the snake row. Upon the completion of these functions, the row is considered completed, and processing begins on the next row.

| SnakeFind_BlobLineEliminate2 - See, also, FIG. 9. |
|---|
| void SnakeFind_BlobLineEliminate2(short Mstart, unsigned char *Sp,unsigned char *Si,float *Sy, unsigned char *St,short NxSnake,short MySnake,unsigned char *bytimage,unsigned char *bytsnake,short Nx,short My,short Nsnakeblobmin,short YdistMax,BOOL Orientation)<br>// SnakeFind_BlobLineEliminate2 - Clears a given line of any blob of ACTIVE snake (ie. Si >0) which is shorter than Nsnakeblobmin in pixels and further away than Ymindist from the pixel to the immediate left<br>//<br>// Input Parameters -<br>//   Unique<br>//    Mstart - The line#. of the current snake matrix upon which the function is operating<br>//    Nsnakeblobmin - All blobs shorter than this number are eliminated<br>//    YdistMax - Vertical pixel distance (up or down), outside of which a blob is considered no longer part of its originally assigned snake.<br>//<br>//   Non-unique (common to most snake functions)<br>//<br>//    *Sp - Snake phase (color) matrix<br>//    *Si - Snake indicator matrix<br>//    *Sy - Snake y value matrix<br>//    *St - Boolean (unsigned char implementation) snake assignment matrix<br>//    NxSnake - Snake width in pixels (usu. corresponds to image width)<br>//    MySnake - # of snake pixel rows (usu # snakes)<br>//    bytimage - Pixel intensity values of captured image<br>//    bytsnake - 'Black' and 'White' matrix/image. Values of 255 indicate a snake stripe, 0 indicates not a snake stripe |

| SnakeFind_BlobLineEliminate2 - See, also, FIG. 9. |
|---|
| //              Nx - Total image width (ie. width of bytimage/bytsnake)<br>//              My - Total image height (ie. width of bytimage/bytsnake)<br>//              Orientation - Boolean value indicating image orientation.<br>//--------------------------------------------------------------------------- |

The subroutine depicted in FIG. 9 performs "blob elimination" operations on a single row of snake matrix. It is based on the idea that a section of snake (a "blob") which is very small can be removed to reduce error propagation through frames and eliminate stray snake points (which are considered pieces of bad data). A snake section is defined by pixels along the snake which are enclosed by empty spots, or points of large discontinuity in the Y direction (that is, a section of snake which is very far away from the snake pixels around it).

The subroutine makes use of three new matrices, each of which is similar in structure to a single row of snake matrix. The Snake Blob matrix, Sb, holds numerical values corresponding to the length in pixels of the blob which contains the corresponding entry in the snake matrices. As further explanation, for the $6^{th}$ snake pixel in the row being operated upon, the $6^{th}$ entry in the Sb matrix holds the length of the snake blob which contains that pixel.

A second matrix, the Snake Blob Number matrix or Sbn, holds the number of the blob which contains the point. Going back to the example, if the $6^{th}$ entry in the Sbn is 2, it means that the $6^{th}$ snake pixel was found in blob number 2. Sbn is used during processing to loop through all identified blobs.

The operation of the subroutine is relatively simple. First, it must identify the length of the blobs. Beginning a loop from the leftmost snake pixel in the row, it progresses through the Si matrix until it finds a snake pixel present. This first pixel is considered a starting pixel. Finding a starting pixel increments a blob number counter and a blob length counter, and sets a flag. When set, the flag causes the subroutine to search for an ending snake pixel. During the search, each pixel which is not an ending pixel contributes to the length of the blob, and so the length counter is incremented. A pixel is said to have ended the blob if it is either absent in the Si matrix (a blank spot), or if the difference between its Y value (from the Sy matrix) and the Y value of the previous pixel is greater than the limiting Ydistmax parameter (corresponding to a sudden jump in Y).

Once an ending pixel is identified, a new loop begins which sets the Sb and Sbn entries for the blob pixels equal to the current values in the blob length counter and blob number counter respectively. At this point, a blob has been identified and catalogued.

The next task is to prepare the loop to find the next blob. If the blob ended due to a blank spot, the blob length counter is zeroed, and the control flag is reset and the loop begins as it did originally; searching through the Si matrix for a new starting pixel. If, however, the blob ended due to a sudden Y jump, the pixel which caused the ending is also the starting pixel for a new blob. Thus the blob length counter is set to 1 and the loop continues to search for the next ending pixel. Notice that the blob counter is never reset to zero.

Once the entire row has been considered and all blobs defined, a second loop processes each pixel, comparing the Sb length entry to the limiting Nsnakeblobmin parameter value. Any pixel which is contained in a blob shorter than the limiting value is eliminated (by making appropriate changes to all snake matrices; setting Si=0 etc.).

One item to note regarding this subroutine is that when it is called by the SnakeFind_SafeTrackN subroutine, the Ydistmax parameter is set to the same value as the growth subroutine search limit.

| SnakeFind_LineGrowLeft/SnakeFind_LineGrowRight - See, also, FIG. 10. |
|---|
| void SnakeFind_LineGrowLeft[Right](short Mstart,short delta,unsigned char<br>*Sp,unsigned char *Si,float *Sy,unsigned char *St,short NxSnake,short<br>MySnake,unsigned char *bytimage,unsigned char *bytsnake,short Nx,short My,BOOL<br>Orientation)<br>// SnakeFind_LineGrowLeft[Right]<br>//      Based on the SnakeFind_GrowLeft[Right] function.<br>//      Performs 'grow left[right] within vertical search range' functionality<br>on a single line,<br>//      Utilizes the boolean St, safe tracking matrix to prevent double-<br>assignments.<br>//<br>// Input Parameters -<br>//         Unique<br>//            Mstart - The line# of the current snake matrix upon which<br>the function is operating<br>//            delta - Vertical pixel distance (up or down), which is<br>considered a valid range for growing<br>//                 the snake being operated upon.<br>//         Non-unique (common to most snake functions)<br>//<br>//            *Sp - Snake phase (color) matrix<br>//            *Si - Snake indicator matrix |

| SnakeFind_LineGrowLeft/SnakeFind_LineGrowRight - See, also, FIG. 10. |
|---|
| ```
//          *Sy - Snake y value matrix
//          *St - Boolean (unsigned char implementation) snake assignment matrix
//          NxSnake - Snake width in pixels (usu. corresponds to image width)
//          MySnake - # of snake pixel rows (usu # snakes)
//          bytimage - Pixel intensity values of captured image
//          bytsnake - 'Black' and 'White' matrix/image. Values of 255 indicate a snake stripe, 0 indicates not a snake stripe
//          Nx - Total image width (ie. width of bytimage/bytsnake)
//          My - Total image height (ie. width of bytimage/bytsnake)
//          Orientation - Boolean value indicating image orientation.
//-------------------------------------------------------------------
``` |

The subroutines represented by FIG. 10, named SnakeFind_LineGrowLeft and SnakeFind_LineGrowRight, are designed to expand previously tracked snakes to the left or right. Like the previous subroutine, these functions operate only on a single row of snake matrix at a time.

The subroutine starts at either end of the row and loops its way to the other. It will begin the growth process whenever there is a pixel which is blank (Si=0) adjacent to a pixel which is active (Si>0). When such a pixel is found, a vertical search loop is performed in the column corresponding to the blank pixel's horizontal position, starting from the active pixel's Y position (that is, the bytsnake search starts from the point immediately adjacent to where the last good pixel would be found). Beginning with 1 pixel and increasing to the limiting value delta, the bytsnake image is searched vertically through an increasingly large distance until a white snake pixel (with corresponding St value of false) is found. If a snake point is identified, the snake matrix entries for the pixel are then updated accordingly. Once the search/assignment process has completed for a given pixel, the search continues. Notice that if the blank pixel is "grown", and the next pixel happens to be blank, the search process will identify the blank pixel as a candidate for growth. Thus entire patches of lost snake area can be recovered with this method.

| SnakeFind_SafeTrackN2x - See, also FIG. 8. |
|---|
| ```
void SnakeFind_SafeTrackN2x(short Nside, short GrowVertRange, short BlobMin,
unsigned char *Sp,unsigned char *Si,float *Sy,unsigned char *St,unsigned char
*Sib4,float *Syb4,short NxSnake,short MySnake,unsigned char *bytimage,unsigned
char *bytsnake,short Nx,short My,BOOL Orientation,short init)
// SnakeFind_SafeTrackN2x
//      Tracking algorithm, based on the TrackN function.
//      Uses a boolean matrix (St) to ensure that each snake stripe is assigned only once.
//      Identical to SnakeFind_SafeTrackN except that it operates only on even numbered lines.
//              It then fills in odd lines by 'pulling down' the even lines.
//
// Input Parameters :
//          Nside - Tracking Distance
//          GrowVertRange - Vertical range for left/right snake grow functions
//          BlobMin- Minimum length for any viable snake 'blob'
//          *Sp - Snake phase (color) matrix
//          *Si - Snake indicator matrix
//          *Sy - Snake y value matrix
//          *St - Boolean (unsigned char implementation) snake assignment matrix
//          *Sib4 - Snake matrix representing the PREVIOUS frame's Si matrix
//          *Syb4 - Snake matrix representing the PREVIOUS frame's Sy matrix
//          NxSnake - Snake width in pixels (usu. corresponds to image width)
//          MySnake - # of snake pixel rows (usu # snakes)
//          bytimage - Pixel intensity values of captured image
//          bytsnake - 'Black' and 'White' matrix/image. Values of 255 indicate a snake stripe, 0 indicates not a snake stripe
//          Nx - Total image width (ie. width of bytimage/bytsnake)
//          My - Total image height (ie. width of bytimage/bytsnake)
//          Orientation - Boolean value indicating image orientation.
//          init - 1 indicates initialize matrix state, 0 indicates non-initialize state.
//              Initialization blanks all Si, Sp, Sy, St matrices, allowing fresh values to be assigned.
//-------------------------------------------------------------------------
``` |

This subroutine is a simple alteration of the SnakeFind_SafeTrackN (FIG. 8) subroutine. It is similar in function and structure to SnakeFind_SafeTrackN except for one variation: This subroutine is designed for a double-density snake structure, commonly referred to as "2×". Normally, only high intensity stripe values (the sinusoidal peaks) are considered snakes, and are known as "positive snakes". In 2×, however, the lowest intensity stripe areas (the sinusoidal valleys), commonly known as "negative snakes", are considered valid snakes as well. During snake definition, positive snakes are assigned even snake numbers while negative snakes are assigned odd numbers. The SnakeFind_SafeTrackN2× subroutine performs standard safe tracking/growth/blob-elimination, as described previously, only on the even numbered snake rows, leaving the odd numbered snakes blank. For display purposes, the final section of the subroutine initializes the odd numbered snake rows, such that the entries have the same values as the previous even entry. Note that by definition of the subroutine, negative snakes are not tracked from frame to frame at all. Instead, they are interpolated from the positions of positive snakes.

negative snake matrix elements which correspond to valleys in the hold pattern. The subroutine loops through the odd-numbered row elements, first checking the even-numbered (positive snake) elements in the rows above and below. If a negative snake pixel is between two active (Si>0) positive snake pixels, the function performs an interpolation operation on the element.

The interpolation operation performs a vertical search in bytimage between the upper and lower positive snakes which enclose the negative snake pixel in question. It considers the intensity value of each pixel (with a mathematical adjustment for surface color variation between the positive snakes) and assigns values to the snake matrices according to the position of the minimum value.

Notice that, if the negative snake color value (in Sp) were taken as the actual color of the negative snake pixel, the resulting 3D model would be color striped. In order to avoid this, the interpolation subroutine uses an assumption of linear color variation between the positive snakes. It uses this linear

```
NegSnakeInterpol - void NegSnakeInterpol(unsigned char *Sp, unsigned char *Si, float *Sy,short
NxSnake, short MySnake,unsigned char *bytimage,unsigned char *bytsnake,short
Nx,short My,BOOL Orientation)
// NegSnakeInterpol
//         For use only with the SnakeFind_SafeTrackN2x function.
//      Fills odd-numbered snake lines with values corresponding to snake minima,
as appearing in bytimage.
//
// Input Parameters :
//         *Sp - Snake phase (color) matrix
//         *Si - Snake indicator matrix
//         *Sy - Snake y value matrix
//         NxSnake - Snake width in pixels (usu. corresponds to image width)
//         MySnake - # of snake pixel rows (usu # snakes)
//         bytimage - Pixel intensity values of captured image
//         bytsnake - 'Black' and 'White' matrix/image. Values of 255 indicate
a snake stripe, 0 indicates not a snake stripe
//            Nx - Total image width (ie. width of bytimage/bytsnake)
//         My - Total image height (ie. width of bytimage/bytsnake)
//         Orientation - Boolean value indicating image orientation.
//-----------------------------------------------------------------------------
```

This subroutine operates only on odd-numbered snake rows (negative snakes). The purpose is to assign values to the model to assign an appropriate (much lighter) color to the negative snake.

```
SnakeFind_CheckTrackN/ SnakeFind_CheckTrackN2x- void SnakeFind_CheckTrackN(short Nside, short GrowVertRange, short BlobMin,
unsigned char *Sp,unsigned char *Si,float *Sy,unsigned char *St,unsigned char
*SpC, unsigned char *SiC,float *SyC,unsigned char * StC,unsigned char *Sib4,float
*Syb4,short NxSnake,short MySnake,unsigned char *bytimage,unsigned char
*bytsnake,short Nx,short My,BOOL Orientation)
// SnakeFind_CheckTrackN[2x]
//      Tracking correction algorithm, based on the TrackN function. To be used
IMMEDIATELY after tracking.
//      Uses a boolean matrix (St) as represented by unsigned chars to ensure that
each snake stripe is assigned only once.
//      Performs bottom-up tracking/growth on matrices, and compares the results
to the originals.
//         Any disagreement is considered grounds for snake point removal.
//
//
// Input Parameters :
//         Nside - Tracking Distance
//         GrowVertRange - Vertical range for left/right snake grow functions
//         BlobMin- Minimum length for any viable snake 'blob'
```

| SnakeFind_CheckTrackN/ SnakeFind_CheckTrackN2x- |
|---|
| //         *Sp - Snake phase (color) matrix |
| //         *Si - Snake indicator matrix |
| //         *Sy - Snake y value matrix |
| //         *St - Boolean (unsigned char implementation ) snake assignment matrix |
| //         *Sib4 - Snake matrix representing the PREVIOUS frame's Si matrix |
| //         *Syb4 - Snake matrix representing the PREVIOUS frame's Sy matrix |
| //         NxSnake - Snake width in pixels (usu. corresponds to image width) |
| //         MySnake - # of snake pixel rows (usu # snakes) |
| //         bytimage - Pixel intensity values of captured image |
| //         bytsnake - 'Black' and 'White' matrix/image. Values of 255 indicate a snake stripe, 0 indicates not a snake stripe |
| //         Nx - Total image width (ie. width of bytimage/bytsnake) |
| //         My - Total image height (ie. width of bytimage/bytsnake) |
| //         Orientation - Boolean value indicating image orientation. |
| //-------------------------------------------------------------------------- |

The purpose of this subroutine is to prevent incorrect assignment of snake identity during the tracking/growth process. It does this by simply performing the tracking process a second time, using temporary local matrices in place of the actual snake matrices, in the opposite direction (that is, looping backwards from the last element to the first). It then compares the values of each entry in the local snake matrices to the original values in the actual snake matrices. Any element which doesn't match is considered a bad element, and it is blanked out from the original snake matrices, thus preventing its error from propagating to future frames.

It may not be perfectly clear how this process is supposed to prevent errors. Assume that in a given frame, all snake pixels are assigned correctly. In the next frame, a snake may have moved a significant distance in the image. Suppose that at some point along a snake, the point that would correctly be identified as part of the snake moves out of the tracking range (or disappears, or has been mistakenly assigned to the snake above, or fell victim to any number of possible scenarios).

There is a possibility that the tracking/growth search will incorrectly assign this snake a point which should have been identified as part of the snake below. In this case, the snake below will also lose a point that it may have otherwise tracked correctly. Thus a misplaced section of snake may cause incorrect assignments throughout any number of snakes below. The subroutine's reversal of the tracking process would mean that any errors would have to propagate upward due to the lower snakes being assigned values first. While most points would be tracked normally in the reversed process, errors in tracking/growth would show up as mismatched snake values in the two tracking processes. Thus, these snake pixels can be eliminated in order to ensure the safety of future tracking operations. In most cases, snake pixels lost during this subroutine will be properly regained in later frames.

The 2× version of the subroutine considers only the even snake rows in the 2× snake matrices, and should be used before interpolation.

| PostProcess_VSearch- |
|---|
| void PostProcess_VSearch(short Nside,unsigned char *Sp,unsigned char *Si,float *Sy,unsigned char *St,short NxSnake,short MySnake,unsigned char *bytimage,unsigned char *bytsnake,short Nx,short My,BOOL Orientation) |
| // PostProcess_VSearch |
| //     Considers entire image. Given any good snake pixel, if the snake pixel above (or below) is blank,it performs a vertical search for a possible good snake. The vertical search will end in the event that |
| //         a)the maximum range value is reached (Nside) |
| //         b)a suitable snake is found |
| //         c)the search 'runs into' a snake that's already been assigned. |
| // |
| //     The function is intended to fill in empty snake sections that fall between good snakes OR are outside the range of snakes which can be tracked (ie. snakes which have never appeared in the image at any time). |
| // |
| //     Intended for post-processing only. |
| // |
| // Input Parameters : |
| //     Unique |
| //     Nside - Maximum distance for vertical search. |
| // |
| //     Non-unique (common to most snake functions) |
| // |
| //     *Sp - Snake phase (color) matrix |
| //     *Si - Snake indicator matrix |
| //     *Sy - Snake y value matrix |
| //     *St - Boolean (unsigned char implementation) snake assignment matrix |
| //     NxSnake - Snake width in pixels (usu. corresponds to image width) |
| //     MySnake - # of snake pixel rows (usu # snakes) |
| //     bytimage - Pixel intensity values of captured image |

-continued

PostProcess_VSearch-

```
//          bytsnake - 'Black' and 'White' matrix/image. Values of 255 indicate
a snake stripe, 0 indicates not a snake stripe
//                Nx - Total image width (ie. width of bytimage/bytsnake)
//                My - Total image height (ie. width of bytimage/bytsnake)
//                Orientation - Boolean value indicating image orientation.
//-----------------------------------------------------------------------------
```

This subroutine is intended to be used only after all tracking has been performed. Special precautions must be taken so that the results of this operation are not introduced into the next frame, but are instead used only for the development of a 3D model of the single frame upon which it operates.

The function operates on the snake matrices in two loops, first in the reversed direction, then in the normal direction. In either loop it checks each pixel to see if the snake pixel above (or below) is blank. If so, it performs a vertical search on bytsnake pixels. If it finds a white pixel within the limit which has yet to be assigned to a snake, it will assign the points values to the empty snake element as though it had been found during normal tracking processes. The search for each pixel will be terminated when the Nside parameter limit has been reached, or when the function encounters a point which has been identified as part of a snake.

This subroutine is usually followed by growth and blob elimination functions in order to smooth out its results.

Further Unique Aspects Contemplated within EXAMPLE 02 Subroutines:

1) Forward-backward revision (an error prevention technique). To prevent incorrect snake identification (which may introduce error not only in the frame in which the error occurs, but also in all subsequent frames), as many potential identity conflicts are removed as possible. Processing of the snakes takes place on a per-pixel 'first come, first serve' basis. For this reason, the identity assigned to a given pixel can sometimes be different depending on the order in which the pixels are processed. FB revision takes advantage of this by performing processing twice, each time in a different order. By comparing the results of each process and removing any pixels at which the results differ, a snake mis-identification can be prevented. One can reason that if the identity of a snake pixel is uncertain enough to be altered by merely changing the processing order, then the pixel should be removed.

2) Snake Tracking matrix. A matrix which prevents errors by marking each potential snake pixel as being 'processed' or 'not processed', thereby preventing situations in which a single pixel would be assigned multiple identity values.

3) 4× interpolation formula. The current implementation makes use of the following formulations.

if I=my+L represents the linear intensity model of the positive snake value (H) and the negative snake value (L) where m=(H−L)/r and r is the difference in position between the two pixels, then the midpoint of the expected model is roughly M=m(r/2)+L. The actual intensity (I2) values found between the positive and negative snake pixels, however, will not be linear due to projector gamma distortion.

Therefore, let M2=I2 such that M−I2 is minimized.

Then, let E=I2−I, and e2 is the point such that D(E(e2)) (that is, the derivative of E evaluated at the point e2) is minimal AND e2 is closer to the positive snake than the negative (where possible).

Here (as depicted in FIG. 11) actual intensity value points are collected, where I2 is closest to the expected midpoint, then find the point where the slope of the difference between the actual and expected intensities is close to zero. The point 138 at which the 4× snake will be placed is the midpoint between M2 and e2. Alternatively, one could simply use E=I2, the actual intensities.

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its innovation. Furthermore, in any claim that is filed herewith or hereafter, any means-plus-function clauses used, or later found to be present, are intended to cover at least all structure(s) described herein as performing the recited function and not only structural equivalents but also equivalent structures.

We claim:

1. A method for 3-dimensional image acquisition, using structured light illumination, of a surface-of-interest under observation by at least one camera, the method comprising the steps of:
   (a) illuminating the surface-of-interest, while static, with structured light to obtain initial depth map data therefor;
   (b) while projecting a hold pattern comprised of a plurality of snake-stripes at the static surface-of-interest, assigning an identity to and an initial lock position of each said plurality of snake-stripes; and
   (c) while projecting said hold pattern, tracking, from frame-to-frame each of said plurality of snake-stripes, to acquire the 3-dimensional image.

2. The method of claim 1, wherein the surface-of-interest is in-motion during said step of tracking each of said plurality of snake-stripes.

3. The method of claim 1, wherein said assigning of said identity to and said initial lock position of each said plurality of snake-stripes occurs generally simultaneously within a processor unit.

4. The method of claim 1, wherein said initial lock position for a respective one of said plurality of snake-stripes comprises information concerning initial whereabouts of pixel placement and an initial frame of said respective snake-stripe.

5. The method of claim 1, after a period of time has passed of said tracking, further comprising the steps of:

(a) illuminating the surface-of-interest with structured light to obtain subsequent depth map data therefor; and
(b) while projecting said hold pattern at the surface-of-interest, assigning a subsequent identity to and a subsequent re-lock position of each said plurality of snake-stripes.

6. The method of claim 5, wherein said subsequent re-lock position for a respective one of said plurality of snake-stripes comprises information concerning subsequent whereabouts of pixel placement and a subsequent frame of said respective snake-stripe.

7. The method of claim 5, wherein said assigning of said identity to and said subsequent re-lock position of each said plurality of snake-stripes occurs generally simultaneously within a processor unit.

8. A method for 3-dimensional image acquisition of a surface-of-interest using structured light illumination, the method comprising the steps of:
(a) projecting a hold pattern comprised of a plurality of snake-stripes;
(b) as the surface-of-interest moves into a region under observation by at least one camera that comprises said projected hold pattern, assigning an identity to and an initial lock position of each said plurality of snake-stripes as it sequentially illuminates the surface-of-interest; and
(c) while projecting said hold pattern, tracking, from frame-to-frame, each of said plurality of snake-stripes while passing through said region.

9. The method of claim 8, wherein the surface-of-interest is in-motion during said steps of projecting said hold pattern and tracking each of said plurality of snake-stripes.

10. The method of claim 8, wherein said step of assigning an identity to and an initial lock position of a respective first one and a respective second one of said plurality of snake-stripes, occurs generally sequentially within a processor unit.

11. The method of claim 8, wherein said initial lock position for a respective one of said plurality of snake-stripes comprises information concerning initial whereabouts of pixel placement and an initial frame of said respective snake-stripe.

12. A method for 3-dimensional image acquisition of a surface-of-interest using structured light illumination, the method comprising the steps of:
(a) projecting, in sequence at the surface-of-interest positioned within a region under observation by at least one camera, a plurality of snake-stripes of a hold pattern by opening a shutter cover;
(b) as each said plurality of snake-stripes sequentially illuminates the surface-of-interest, assigning an identity to and an initial lock position of each said snake-stripe; and
(c) while projecting said hold pattern, tracking, from frame-to-frame, each of said plurality of snake-stripes once it has illuminated the surface-of-interest and entered said region.

13. The method of claim 12, wherein the surface-of-interest is in-motion during said steps of projecting said hold pattern and tracking each of said plurality of snake-stripes.

14. The method of claim 12, wherein said step of assigning an identity to and an initial lock position of a respective first one and a respective second one of said plurality of snake-stripes, occurs generally sequentially within a processor unit.

15. The method of claim 12, wherein said initial lock position for a respective one of said plurality of snake-stripes comprises information concerning initial whereabouts of pixel placement and an initial frame of said respective snake-stripe.

16. A system for 3-dimensional image acquisition, using structured light illumination, of a surface-of-interest under observation by at least one camera, the system comprising:
(a) at least one projector adapted for illuminating the surface-of-interest, while static, with structured light to obtain initial depth map data therefor;
(b) said projector further adapted for projecting a hold pattern comprised of a plurality of snake-stripes at the static surface-of-interest, while a processor unit assigns an identity to and an initial lock position of each said plurality of snake-stripes; and
(c) while said projector projects said hold pattern, said processor unit to track, from frame-to-frame each of said plurality of snake-stripes, to acquire the 3-dimensional image.

17. The system of claim 16, wherein said processor unit assigns said identity to and said initial lock position of each said plurality of snake-stripes, generally simultaneously.

18. A system for 3-dimensional image acquisition of a surface-of-interest using structured light illumination, the system comprising:
(a) at least one projector adapted for projecting a hold pattern comprised of a plurality of snake-stripes;
(b) as the surface-of-interest moves into a region under observation by at least one camera that comprises said projected hold pattern, a processor unit adapted for assigning an identity to and an initial lock position of each said plurality of snake-stripes as it sequentially illuminates the surface-of-interest; and
(c) while said projector projects said hold pattern, said processor unit to track, from frame-to-frame, each of said plurality of snake-stripes while passing through said region.

19. The method of claim 18, wherein said processor unit assigns an identity to and an initial lock position of a respective first one and a respective second one of said plurality of snake-stripes, generally sequentially.

20. A system for 3-dimensional image acquisition of a surface-of-interest using structured light illumination, the system comprising:
(a) at least one projector adapted for projecting, in sequence at the surface-of-interest positioned within a region under observation by at least one camera, a plurality of snake-stripes of a hold pattern by opening a shutter cover;
(b) as each said plurality of snake-stripes sequentially illuminates the surface-of-interest, a processor unit adapted for assigning an identity to and an initial lock position of each said snake-stripe; and
(c) while said projector projects said hold pattern, said processor unit to track, from frame-to-frame, each of said plurality of snake-stripes once it has illuminated the surface-of-interest and entered said region.

21. The method of claim 20, wherein said processor unit assigns an identity to and an initial lock position of a respective first one and a respective second one of said plurality of snake-stripes, generally sequentially.

22. A computer readable storage medium having stored thereon, program code for 3-dimensional image acquisition, using structured light illumination, of a surface-of-interest under observation by at least one camera, the program code comprising:
(a) a first program sub-code for illuminating the surface-of-interest, while static, with structured light to obtain initial depth map data therefor;
(b) a second program sub-code for, while projecting a hold pattern comprised of a plurality of snake-stripes at the static surface-of-interest, assigning an identity to and an initial lock position of each said plurality of snake-stripes; and (c) a third program sub-code for, while projecting said hold pattern, tracking, from frame-to-frame each of said plurality of snake-stripes, to acquire the 3-dimensional image.

23. A computer readable storage medium having stored thereon, program code for 3-dimensional image acquisition of a surface-of-interest using structured light illumination, the program code comprising:

(a) a first program sub-code for projecting a hold pattern comprised of a plurality of snake-stripes;

(b) a second program sub-code for, as the surface-of-interest moves into a region under observation by at least one camera that comprises said projected hold pattern, assigning an identity to and an initial lock position of each said plurality of snake-stripes as it sequentially illuminates the surface-of-interest; and (c) a third program sub-code for, while projecting said hold pattern, tracking, from frame-to-frame, each of said plurality of snake-stripes while passing through said region.

24. A computer readable storage medium having stored thereon, program code for 3-dimensional image acquisition of a surface-of-interest using structured light illumination, the program code comprising:

(a) a first program sub-code for projecting, in sequence at the surface-of-interest positioned within a region under observation by at least one camera, a plurality of snake-stripes of a hold pattern by opening a shutter cover;

(b) a second program sub-code for, as each said plurality of snake-stripes sequentially illuminates the surface-of-interest, assigning an identity to and an initial lock position of each said snake-stripe; and (c) a third program sub-code for, while projecting said hold pattern, tracking, from frame-to-frame, each of said plurality of snake-stripes once it has illuminated the surface-of-interest and entered said region.

* * * * *